US007508985B2

(12) United States Patent
Van Lunteren

(10) Patent No.: US 7,508,985 B2
(45) Date of Patent: Mar. 24, 2009

(54) PATTERN-MATCHING SYSTEM

(75) Inventor: Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 10/970,798

(22) Filed: Oct. 21, 2004

(65) Prior Publication Data

US 2005/0132342 A1 Jun. 16, 2005

(30) Foreign Application Priority Data

Dec. 10, 2003 (EP) ................................ 03405884

(51) Int. Cl.
*G06K 9/00* (2006.01)
*G06F 17/30* (2006.01)

(52) U.S. Cl. ........................................ 382/181; 707/6

(58) Field of Classification Search ................. 382/159, 382/165, 170, 181, 193, 194, 199, 209, 218; 704/221, 243; 707/2, 6; 717/143
See application file for complete search history.

(56) References Cited

U.S. PATENT DOCUMENTS 5,329,405 A * 7/1994 Hou et al. ...................... 707/6
6,094,647 A * 7/2000 Kato et al. ..................... 707/2

OTHER PUBLICATIONS

Article: Jan Van Lunterern, "Searching Very Large Routing Tables in Wide Embedded Memory", IEEE Global Telecommunications Conference Globecom'01, vol. 3, pp. 1615-1619, San Antonio, Texas, Nov. 2001.

* cited by examiner

*Primary Examiner*—Abolfazl Tabataba
(74) *Attorney, Agent, or Firm*—McGinn IP Law Group, PLLC

(57) ABSTRACT

An XML parsing system includes a pattern-matching system 1 that receives an input stream 2 of characters corresponding to the XML document to be parsed, and provides an output 3 for subsequent processing in software by a processor 4. The pattern matching system 1 includes two main components, a controller in the form of a programmable state machine 5, which is programmed with an appropriate state transition diagram 6, and a character processing unit 7 in the form of a token and character handler. The programmable state machine 5 controls the character processing unit 7 to, e.g., compare characters in the input character stream 2 with other received or stored characters. The character processing unit 7 then provides feedback to the programmable state machine controller 5, e.g., as to whether the compared characters match, so that the programmable state machine controller 5 can then parse the received document accordingly.

1 Claim, 22 Drawing Sheets

| | current state / input | next state |
|---|---|---|
| | 101 1111b | 101b (S5) |
| state S5 | ⋮ | ⋮ |
| | 101 0000b | 101b (S5) |
| | 100 1111b | 000b (S0) |
| | ⋮ | ⋮ |
| | 100 1100b | 000b (S0) |
| | 100 1011b | 101b (S5) |
| | 100 1010b | 100b (S4) |
| state S4 | 100 1001b | 000b (S0) |
| | ⋮ | ⋮ |
| | 100 0010b | 000b (S0) |
| | 100 0001b | 001b (S1) |
| | 100 0000b | 000b (S0) |
| | 011 1111b | 011b (S3) |
| state S3 | ⋮ | ⋮ |
| | 011 0000b | 011b (S3) |
| | 010 1111b | 000b (S0) |
| | ⋮ | ⋮ |
| | 010 1011b | 000b (S0) |
| | 010 1010b | 100b (S4) |
| | 010 1001b | 000b (S0) |
| state S2 | ⋮ | ⋮ |
| | 010 0010b | 000b (S0) |
| | 010 0001b | 011b (S3) |
| | 010 0000b | 000b (S0) |
| | 001 1111b | 000b (S0) |
| | ⋮ | ⋮ |
| | 001 1011b | 000b (S0) |
| | 001 1010b | 100b (S4) |
| | 001 1001b | 000b (S0) |
| state S1 | ⋮ | ⋮ |
| | 001 0011b | 000b (S0) |
| | 001 0010b | 010b (S2) |
| | 001 0001b | 001b (S1) |
| | 001 0000b | 000b (S0) |
| | 000 1111b | 000b (S0) |
| | ⋮ | ⋮ |
| | 000 1011b | 000b (S0) |
| | 000 1010b | 100b (S4) |
| | 000 1001b | 000b (S0) |
| state S0 | ⋮ | ⋮ |
| | 000 0010b | 000b (S0) |
| | 000 0001b | 001b (S1) |
| | 000 0000b | 000b (S0) |

Fig. 4 state transition diagram

| current state | input | next state | output |
|---|---|---|---|
| s0 | 1 | s1 | 0 |
| s0 | A | s4 | 0 |
| s0 | 0,2..9,B..F | s1 | 0 |
| s1 | 1 | s1 | 0 |
| s1 | 2 | s2 | 0 |
| s1 | A | s4 | 0 |
| s1 | 0,3..9,B..F | s0 | 0 |
| ... | ... | ... | ... |
| s4 | 0,2..9,C..F | s0 | 0 |

state transition table

70                  71 transition rule vector

| test part | | | | result part | | |
|---|---|---|---|---|---|---|
| cur. state | input character | cond. | mask | next FSM | next state | output |

72     73        74   75    78    76     77 state transition diagram

PATTERN-MATCHING SYSTEM

The present invention relates to a system for pattern-matching, and more particularly to such a system that is suitable for parsing, e.g., of computer programming languages.

TECHNICAL FIELD AND BACKGROUND OF THE INVENTION

Parsing and pattern-matching are important functions for many different applications, including compilers for programming languages, security, e.g., intrusion detection, virus scanning, etc., and data compression.

As is known in the art, parsing and pattern-matching typically involves testing an input document, in the form of an input stream of characters, to see if it meets or matches one or more conditions. Examples of such conditions include testing if a character is part of a reserved word or variable or attribute name, if the character obeys any defined naming conventions, e.g., what characters are allowed to be part of such a name, and/or if the character string obeys the relevant syntax rules, etc. The latter may also include checking the character string against certain document state information, such as, for example, testing a new variable name against a list of all previously processed variable names to determine if the new variable name is unique. Another example would be to test if a value assigned to a variable is in accordance with the type declaration of that variable.

These functions are typically implemented in software. However, the Applicants have recognized that the parsing and pattern-matching performance of existing, conventional software implementations can be limited, e.g., due to the way in which the processors implementing the software tend to operate.

Furthermore, newer applications that require parsing and pattern-matching functions that impose significantly higher processing throughput requirements regarding, e.g., the number of characters and/or documents that need to be parsed and/or searched for patterns per unit time, and/or that require significantly reduced latency in the parsing/pattern-matching process are becoming more commonplace.

An example of such applications is emerging applications based on the Extensible Markup Language (XML), which provides, as is known in the art, a standard format to exchange electronic documents. These applications of XML include web-pages, data storage and retrieval, communications protocols, e.g., XML-RPC and SOAP, object serialization, etc. These applications have in common that they require a high-performance parser function for processing the XML-based information.

The Applicants believe therefore that there will increasingly become a need for more efficient parsing and pattern-matching systems.

Objects and Advantages of the Invention

According to a first aspect of the present invention, there is provided an apparatus for pattern-matching characters in a stream of received characters, the apparatus comprising:

a character processing unit comprising means for storing characters, and means for comparing a received input character with one or more stored characters; and a controller for controlling the character processing unit, the controller including means for receiving an input stream of characters to be pattern-matched and means for controlling the character processing unit to compare characters from the input stream with characters stored by the character processing unit.

According to a second aspect of the present invention, there is provided a method of pattern-matching characters in a stream of received characters, the method comprising:

storing one or more characters in a character processing unit comprising means for storing characters;

selectively providing one or more characters from a received input character stream to the character processing unit; and controlling the character processing unit to compare a received input character with one or more of the characters stored by the character processing unit.

The pattern-matching system of the present invention includes a character processing unit that is able to store and compare characters under the control of a controller of the system.

The Applicants have recognized that conventional parsing and pattern-matching systems that use general purpose processors can be restricted by the fact that conventional general purpose processors do not handle character and string functions very efficiently. This is because "basic" character handling functions such as encoding, combining characters in a string, string copy, and compare operations, etc., may each require a significant number of instructions to implement them, thereby resulting in decreased performance.

However, by providing a character processing unit that can store and compare characters and that can be used by a controller receiving the character stream, e.g., document, to be parsed or pattern-matched as in the present invention helps to alleviate and overcome these problems, because it allows the character handling functions to be offloaded to the character processing unit, rather than them having to be carried out in software on the main processor of the system such as would be the case with existing software implemented parsing and pattern-matching.

The character processing unit carries out character handling functions, including at least storing and comparing characters. Most preferably the character processing unit can store and retrieve (read and write) characters and character strings, and compare stored characters and/or character strings with input characters or character strings that it receives from the input character stream.

Thus, in a preferred embodiment, the character processing unit includes a memory into which it can write characters, and character strings, and from which it can retrieve characters and character strings for, e.g., comparison purposes.

The character processing unit is preferably able to store characters received in the input character stream for later retrieval, e.g., as those characters are provided to it by the controller.

In a particularly preferred embodiment, characters or character strings can also be pre-stored in the character processing unit, i.e., the character processing unit can be preloaded with characters and character strings as well as storing characters from an input character stream to be pattern-matched. Thus the character processing unit preferably stores one or more predetermined characters or character strings. This may be useful where, e.g., particular, known and predefined character strings may be expected in the input character stream and it is desired to identify such character strings in the input character stream, which, as is known in the art, is a relatively common occurrence in, e.g., programming language parsing.

The way that the character strings are preloaded in the character processing unit can be selected as desired. They could, for example, be stored by providing an appropriate input character stream containing the character strings in question to the character processing unit, or by writing them directly to the character processing unit, e.g., its memory, using a dedicated, e.g., memory, interface.

The character processing unit is preferably able to identify particular strings of characters that it has stored or is storing. Thus it is preferably able to "combine", e.g., stored, characters into strings. This is preferably done by storing information allowing the set of characters forming the desired character string to be identified. Most preferably, this is done by storing information identifying the boundaries of the character string, such as the start and end characters in the string, e.g., by storing the addresses of the start and end characters in the string. It would also, e.g., be possible to store the data identifying the characters forming a string at a certain memory location/address, and to then use that memory address directly or indirectly as the character string identifier.

Preferably each stored character string is given a unique identity that can be used to identify and retrieve the character string. Most preferably the character string identity is stored in association with the data, e.g., start and end addresses, identifying the characters forming the string. In a particularly preferred embodiment, individual character strings are associated with "tokens", with each token having a, preferably unique, identifier, thereby identifying the character string, and having stored associated therewith data identifying the stored characters forming the string, preferably in form of the start and end addresses for the character string.

Thus, in a particularly preferred embodiment, the character processing unit includes a memory that stores the character string information, e.g., start and end addresses, relating to each character string (token). As will be appreciated by those skilled in the art, this "token" memory could be a separate memory device to the character-storing memory, or simply part of the same overall memory device.

The character processing unit is accordingly preferably able combine characters into an identifiable character string, e.g., by creating a new character token and storing the start and end address of the character string in the token memory, where provided.

The character processing unit can preferably also select and, e.g., read out, a stored character, character string or selected characters from a stored character string, etc. This is preferably be done by using the character string identifier, e.g., token, stored for the character string. In another preferred embodiment, character strings can also or instead be retrieved on a last-in, first-out (LIFO) basis. The Applicants believe that this latter arrangement may be particularly suited to situations such as can occur in, e.g., XML parsing, where it is desired to check that successive character strings in a given document match each other. Most preferably the character processing unit can also identify if the character it has currently retrieved from its memory is the last character of the current character string.

As discussed above, the character processing unit includes means such as suitable logic for comparing characters with one another. Most preferably a character of a stored character string can be compared with a "current" input character from the input character stream to be analyzed.

The character processing unit is preferably also able to provide an output that can then be used, e.g., as feedback, by the controller to further control the overall input character stream processing operation. Thus, for example, the character processing unit can preferably output the results of each character comparison, e.g., whether characters being compared match, indicate to the controller whether the current character being assessed is the last character of the current character string and/or provide other character or character string related feedback.

The character processing unit can preferably also output an indication of whether the characters being analyzed are of a particular type, e.g., whether a character is part of a certain, e.g., predefined, group of characters, such as "white space", e.g., space, carriage return, tab, or line feed characters, or if the character is a valid character for use in, e.g., an element, variable or attribute name or value. The character processing unit can also preferably determine, and provide feedback on, encoding of or in the input bit stream, and/or whether other conditions have occurred, such as the end of the input stream being reached, that there are no more character strings stored in its memory, etc.

In a particularly preferred embodiment, as well or instead of being able to provide feedback relating to characters in the input character stream as discussed above, the character processing unit can output characters themselves, e.g., for subsequent inclusion in an output character stream. This could be desirable where, e.g., it is desired to translate character strings in the input character stream into another form, e.g., from XML to HTML, to add new character strings to the input character stream, or to correct errors in the input character stream, etc. Thus in a particularly preferred embodiment the character processing unit can output characters and/or character strings. This could be the current input character or character string, a character or character string retrieved from the character processing unit memory, and/or a character or character string provided by the controller, e.g., as an operand value associated with a given command (see below).

The character processing unit is accordingly preferably able to carry out character and/or character string conversion operations. This could be, e.g., to convert a hexadecimal string representation of a number into the actual number (integer), e.g., to convert, e.g., 0x12AB"into the actual hexadecimal value, and/or, e.g., to convert character encoding, e.g., UTF-8 into UTF-16.

The character processing unit is preferably implemented, so far as possible, in hardware, although it could still be implemented or at least partially implemented in software, where appropriate or desired. Thus in a particularly preferred embodiment, the character processing unit includes a memory unit, character comparison logic and appropriate control logic. It is preferably implemented on a single chip (silicon substrate), although that is not essential.

As discussed above, the system of the present invention also includes a controller that receives the input character stream to be pattern-matched or parsed, and then controls the character processing unit to carry out character comparisons, store and retrieve characters, etc.

Thus the controller can preferably send commands or instructions to the character processing unit, e.g., to command the character processing unit to write and read characters and/or character strings to and from its memory, to compare stored characters or character strings with the input character stream, and/or to output, e.g., stored, characters or character strings. This is preferably done, where appropriate, by the controller providing to the character processing unit the identity of the character string, e.g., token identifier, in question.

These operations are preferably carried out by the controller in response to the characters received in the input character stream. Thus, the controller can preferably assess each character in the input character stream and then selectively, for example, on the basis of whether the input character is of a type that should be compared with a previously received or stored character, control and use the character processing unit on the basis of that assessment.

The controller also preferably receives the outputs from the character processing unit and processes and/or acts upon those outputs accordingly. Thus it can preferably evaluate the "feedback" or result information from the character processing unit, e.g., whether the input character matched a stored character or not, and react thereto.

The controller preferably also controls the overall output of system, e.g., whether the input character stream is simply output in the form that it is received, whether parts of the input character stream are deleted or replaced with other characters or character strings, whether characters or character strings stored by the character string processing unit are inserted in the output stream (as discussed above), etc. Thus in a particularly preferred embodiment the controller is operable to perform one or more of the following output functions: write the current input character to the output character stream; write a character or character string from the character processing unit, e.g., the "current" character in the character memory, to the output stream; output information otherwise generated by the controller, e.g., by writing it to the output character stream; and/or provide no output at all.

The controller also controls the provision of the input character stream to, e.g., the character processing unit and/or to the output of the system. In a particularly preferred embodiment, the controller is able to delay or pause the processing and input of the input character stream. This would make it possible, e.g., to process a single input character using a function that takes longer to execute and/or using multiple functions that are executed sequentially. It would also, e.g., facilitate the insertion of additional information within an input character stream that is, e.g., being "copied" to the output of the system.

The controller itself can be any suitable device, e.g., processor, that can control the operation of the character processing unit and operate as described above. It is preferably programmable. In a particularly preferred embodiment, the controller is a "fast" device that can control, and respond to, the character processing unit substantially in "real time", e.g., can preferably respond to outputs of the character processing unit within one or only a few clock cycles.

As discussed above, the controller receives the input character stream and operates to analyze and pattern-match it, using the character string processing unit where appropriate. It preferably does this by evaluating each character in the input stream in turn.

Most preferably the controller can evaluate multiple conditions for, e.g., a given character and then select a corresponding action all in a relatively short time period. Most preferably it can evaluate multiple conditions for, e.g., a given character, in parallel and/or simultaneously. This is all most preferably done within a single clock cycle.

This facilitates finer grain control of the "instruction execution flow", which the Applicants have recognized is desirable to allow more efficient evaluation of multiple conditions that can typically occur at the level of individual characters, as well as strings of consecutive characters, in the overall "stream" of characters that is to be parsed or pattern-matched. This should be contrasted with a more "conventional" software approach, in which conditions can typically only be evaluated one at a time and are typically used to control conditional branch functions, e.g., jump on zero, which means that conditions will typically only affect the "instruction execution flow" at a coarse granularity of multiple blocks of sequentially executed instructions.

In a particularly preferred embodiment, the controller is in the form of a programmable state machine. The use of a programmable state machine is advantageous, because, as is known in the art, a programmable state machine can evaluate multiple conditions in parallel and select a corresponding action, typically within a single clock cycle, which as discussed above is particularly advantageous for pattern-matching and parsing applications.

Indeed, the Applicants believe that the provision of a programmable state machine in combination with a character processing unit as in the present invention is particularly advantageous as this can provide a pattern-matching system that is both programmable and that can achieve high performance through tight control of the character and character string handling functions by supporting fast evaluation of multiple conditions in parallel and reaction thereto, which features are important for many parsing and pattern-matching applications.

Thus according to a third aspect of the present invention, there is provided an apparatus for performing pattern matching of an input character stream, comprising:

a character processing unit that can store characters and compare characters provided to it with characters that it has stored; and a programmable state machine for receiving the input character stream and for controlling the character processing unit to compare characters in the input character stream with characters stored by the character processing unit.

According to a fourth aspect of the present invention, there is provided a method of performing pattern-matching of an input character stream, the method comprising:

receiving the input character stream at a programmable state machine; and the programmable state machine controlling a character processing unit that has stored one or more characters to compare characters in the received input character stream with a character or characters stored by the character processing unit.

These aspects and embodiments of the present invention can, as will be appreciated by those skilled in the art, include any one or more or all of the preferred and optional features of the invention described herein.

Where the controller is implemented as a programmable state machine then any suitable programmable state machine design can be used.

However, in a particularly preferred embodiment, the programmable state machine transition rules that include a ternary test vector, e.g., in the form of a test value/mask that tests for bit values "0", "1", or "wildcard" ("don't care"), that is compared against the current state register value and, optionally, e.g., other conditions, such as, e.g., the current (character) input value. The matching transition rule with the highest priority is then selected as the state transition to be triggered by the input character and used to determine the next state. In a preferred arrangement, plural so-called state spaces are used to facilitate the use of state registers with a limited fixed size, thereby increasing the efficiency of the implementation (this will be discussed further below).

Thus, in a particularly preferred embodiment of the present invention, the controller is in the form of a programmable state machine in which state transitions are represented as a list of state transition rules that involves match operators and priorities, with the next state and output being determined by searching the state transition rule list for the highest priority state transition rule that matches the current state and input. Preferably the state transition rules are in the form of ternary test vectors. Preferably the state transition rules involve wildcards, e.g., "don't care" conditions, and/or priorities. This arrangement provides a set of state transition rules for the programmable state machine that is more efficient than in conventional programmable state machines.

The highest priority state transition rule is preferably searched for using a form of the BaRT algorithm (as described, e.g., in J. van Lunteren, "Searching very large routing tables in wide embedded memory," Proceedings of the IEEE Global Telecommunications Conference GLOBECOM'01, vol. 3, pp. 1615-1619, San Antonio, Tex., November 2001). This further reduces the state transition rule storage requirements. Thus, in a preferred embodiment, the transitions (rules) are selected using a form of the BaRT algorithm.

Where the BaRT algorithm is being used, the encoding of the states, which will be discussed in more detail below, is preferably such that all the encoding bit positions that are part of the hash index determined using the BaRT algorithm are at consecutive positions in the encoding vectors for the states, as that allows the bits that form the hash index to be extracted more easily from the state vector, e.g., by performing a mask operation, e.g., bitwise AND operation with a vector, on the state value It is also preferred to partition the state transition diagram into multiple smaller segments, i.e., to distribute the possible states over multiple state spaces implemented using separate state transition rule lists. In this case, each state-transition rule is, e.g., extended with the index mask and a base address pointer of the appropriate state transition rule list for the next state indicated by the state-transition rule.

The way that the controller operates to control and use the character processing unit in response to the input character stream can be selected as desired. As discussed above, the controller preferably "tests" or evaluates characters in the input stream (in turn) and operates and controls the character processing unit accordingly in response to the test result. Thus, for example, where the controller is in the form of a programmable state machine, the form of the input character could be used to trigger a particular state transition, as is known in the art. The input character can preferably also trigger the sending of a command, etc., to the character processing unit, if appropriate.

Thus, for example, where the controller is in the form of a programmable state machine, the state transition rules preferably additionally include, e.g., a command field that can be used to indicate a required operation of the character processing unit if, e.g., particular test criteria, such as a current state and input character conditions, are met. Thus, for example, the state transition rules preferably further include one or more of a test option field, command option field, e.g., for the character processing unit, and an operand field, to facilitate control of the character processing unit in response to the received input character stream.

It is believed that such arrangements may be new in the context of programmable state machines generally. Thus, according to a fifth aspect of the present invention, there is provided a programmable state machine in which one or more state transitions can cause the programmable state machine to send a command or instruction to a processing unit under the control of the programmable state machine.

According to a sixth aspect of the present invention, there is provided a method of creating a data structure for a programmable state machine, comprising:

deriving and storing a set of state transitions for the state machine;

wherein one or more of the stored state transitions can cause the programmable state machine to send a command or instruction to a processing unit under the control of the programmable state machine.

This aspect of the invention can include any one or more or all of the preferred and optional features of the invention described herein. Thus, for example, the state transitions are preferably represented by state transition rules, with one or more of the state transition rules accordingly including a command field or portion that can be used to control the issuing of a command or instruction to an associated processing unit, such as a character processing unit in accordance with the present invention It is also preferred for the controller to be able to control the input character stream, e.g., to "hold" or pause the input of characters to the controller. This would allow, e.g., the same input character to be processed in multiple consecutive cycles, or the input stream to be paused (held) while executing functions that last multiple cycles. Where the controller is in the form of a programmable state machine, this is again preferably facilitated by including an appropriate command field in the state transition rules.

Thus according to a seventh aspect of the present invention, there is provided a programmable state machine in which one or more state transitions can cause the programmable state machine to pause the input of data to the programmable state machine.

According to an eighth aspect of the present invention, there is provided a method of creating a data structure for a programmable state machine, comprising:

deriving and storing a set of state transitions for the state machine;

wherein one or more of the stored state transitions can cause the programmable state machine to pause the input of data to the programmable state machine.

This aspect of the invention can again include any one or more or all of the preferred and optional features of the invention described herein. Thus, for example, the state transitions are preferably represented by state transition rules, with one or more of the state transition rules accordingly including a command field or portion that can be used to pause or hold the input, e.g., of characters from the input character stream, to the programmable state machine.

In a particularly preferred embodiment where a programmable state machine is being used, a mechanism is provided whereby the process can be sent from one or more states to a subset or subroutine of state transitions that may be common to different "locations" within the overall state diagram. Thus preferably there is a common set of states/transitions that can be invoked from different locations within the state diagram, with the system then returning to its original location, or, indeed, a different location, once the subset of state transitions has been completed. This provides a form of procedure call and return mechanism for common sets of states/state transitions that would otherwise have to be "stored" for multiple different locations within the overall state diagram.

This function is preferably achieved by using a stack for state space addresses in which the current state space address and a state register value can be stored ("pushed") for later retrieval ("popping") once the invoked subset (subroutine) of states/transitions has been completed to allow the system to return to the desired part of the overall state diagram. In a preferred such embodiment, a "state space" identification, e.g., identifying the relevant part or segment of the overall state diagram (as discussed above), and a corresponding mask are pushed/popped onto/from the state stack.

In these embodiments, the return state from the procedure call, i.e., the state that is returned to, could, e.g., be the location from which the procedure originally jumped, i.e., from where the procedure call was made In a preferred embodiment it would also or instead be possible to select a different location for the system to return to. Thus, preferably, the system provides a means of selecting or varying the return location. It would also instead be possible to, e.g., fix the return state, e.g., to state SO, for some or all "procedure calls". In this latter case, there would be no need to store the "return" state in the state block.

It is again believed that these arrangements may be new in the context of programmable state machines generally. Thus, according to a ninth aspect of the present invention, there is provided a programmable state machine comprising means for invoking a single common set of state transitions from more than one location in the state diagram that the state machine is programmed to represent.

According to a tenth aspect of the present invention, there is provided a method of creating a data structure for a programmable state machine, comprising:

deriving and storing a set of state transitions for the state machine; and deriving and storing a plurality of other state transitions that will invoke the stored set of state transitions.

These aspects and arrangements of the present invention can again include any one or more or all of the preferred and optional features of the invention described herein. Thus, for example, the state transitions are preferably represented as (sets of) state transition rules, preferably involving wildcards and/or priorities, and, most preferably, the BaRT algorithm is used for searching the state transitions (rules).

Such arrangements involving "procedure calls" and a state stack could also be viewed as the system comprising multiple finite state machines that each, e.g., implement a given procedure, with one finite state machine being active at any given time. A different finite state machine could then be activated (called) from the "current" finite state machine by a given state transition.

In this case, a "procedure call" would accordingly involve calling another finite state machine while the current active finite state machine and a local return state within that current finite state machine would be stored for later retrieval, i.e., pushed on the state stack Then, when the new, called finite state machine reaches the "return" state transition, the stored finite state machine identity and local state can be retrieved (popped) in order to return the system to the original, calling finite state machine and a desired local state within that finite state machine. In another such arrangement, the return state within the "calling" finite state machine could, e.g., be predetermined or fixed, in which case would not be necessary to store the local return state in the state stack.

Where the controller is in the form of a programmable state machine that uses state transition rules to represent state transitions, then in a particularly preferred embodiment, the state transition rules can be of a plurality of different types, with each type of rule involving different test conditions. For example, one type of rule could involve test conditions relating to the current state and input character (as discussed above), and another type of rule could instead relate, e.g., to error conditions such as memory overflow situations, that may, e.g., not be particular to any given state or input character In such an arrangement, the highest priority matching transition rule is again preferably determined, but in order to determine if a rule is matching, different conditions will be evaluated, depending on the test conditions of each rule An arrangement in which one set of rules relates to error conditions could be used, e.g., to make a transition into a certain error state upon the occurrence of an error, irrespective of the current state and input.

It is again believed that such an arrangement may be new and advantageous in the context of programmable state machines more generally. Thus, according to an eleventh aspect of the present invention, there is provided a programmable state machine in which state transitions are represented by state transition rules, wherein one or more of the state transition rules include one set of test condition types, and one or more other of the state transition rules include a different set of test condition types.

According to a twelfth aspect of the present invention, there is provided a method of creating a data structure for a programmable state machine, comprising:

deriving and storing a set of state transitions for the state machine that include one set of test condition types; and deriving and storing another set of state transitions for the state machine that include a different set of test condition types.

These aspects of the present invention can again include one or more or all of the preferred and optional features of the invention described herein. Thus, for example, one of the sets of test condition types is preferably dependent on the current state and/or current input value, and the other set of test condition types is preferably additionally or instead dependent on an error condition.

This arrangement of the state transition test conditions facilitates in particular the use of state transition rules that can be considered to be "global" in nature, i.e., that, in contrast to "normal" state transition rules that are specifically related to a particular state space, and can accordingly be regarded as "local" rules, are not related to a specific state space, but instead apply more generally across the state diagram, together with more "local" rules that are dependent on a particular state. An example of a more "global" rule, might be error condition dependent rules, as discussed above.

The use of such global state transition rules avoids, e.g., the need to store each "global" rule multiple times, once for each state space where it might apply, which might otherwise particularly be necessary where the state machine uses plural state spaces as discussed above. The global transition rules are accordingly preferably only inserted once in the state diagram data structure. The use of global transition rules in this way also facilitates more flexible and storage-efficient implementation of programmable state machines.

Thus, according to a thirteenth aspect of the present invention, there is provided a programmable state machine which includes state transition rules that are specifically related to particular states and state transition rules that do not relate to any particular state.

According to a fourteenth aspect of the present invention, there is provided a method of creating a data structure for a programmable state machine comprising:

deriving state transition rules that are specifically related to particular states; and deriving state transition rules that do not relate to any particular state.

In the above aspects and arrangements of the invention, the two or more different types of state transition rules, e.g., "global" and "local" rules, are preferably evaluated in parallel, and are preferably evaluated separately.

As discussed above, a priority scheme arrangement is preferably further used for selecting which rule is to be used to control the transition to a new state, in the event that two or more of the different rule types, e.g., both a "global" transition rule and a "local" transition rule, are found to be matched. For example, "error condition" rules could be given the highest priority so as to ensure that an error condition is always responded to.

Thus the programmable state machine preferably includes some form of rule selector for supporting the multiple types of transition rules. This could, e.g., be in the form of separate transition rule memories and rule selectors which operate in parallel, with a multiplexer then selecting between, e.g., the highest priority matching transition rule or rules found for each transition rule type by each (individual) rule selector. Additionally or alternatively, if the number of transition rules of a certain type is relatively small, for example covering a limited set of error conditions, then that set of rules could, e.g., be implemented directly in a set of registers with corresponding comparator functions.

In use of the present invention, the input character stream, e.g., document to be parsed, will be provided to the controller which will then assess each received character and carry out operations in response to the character, such as, for example, providing it to the character processing unit for storage and/or comparison, performing another operation, or providing the input character to the output character stream, etc. It will also monitor any feedback signals from the character processing unit and operate accordingly, for example to accept or reject the input document, cause the character processing unit to write characters to the output character stream, etc. The controller preferably also carries out a lexical analysis of the input character stream to, e.g., divide it into selected character strings.

The present invention can be implemented as desired. As will be appreciated by those skilled in the art, it will find particular application in servers and network systems, particularly where, e.g., it is desired to, e.g., parse many XML documents in quick succession. Thus the present invention also extends to a computer system and to a server including any of the above aspects of the present invention.

The present invention can be used whenever it is desired to carry out pattern-matching a stream of characters, such as for parsing. As discussed above, it is believed that the present invention will be particularly, but not exclusively, useful for parsing of XML documents. Thus the present invention also extends to the use of the methods and apparatus of the present invention for XML parsing.

The methods in accordance with the present invention may be implemented at least partially using software e.g., computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software which when used to operate a pattern-matching or parsing system comprising data processing means causes in conjunction with said data processing means said system to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

DESCRIPTION OF THE DRAWINGS

A number of preferred embodiments of the present invention will now be described by way of example only and with reference to the accompanying drawings, in which:

FIG. 4 shows a prior art programmable state machine implementation for the state diagram of FIG. 3;

DETAILED DESCRIPTION OF PREFERRED EMBODIMENTS

A number of preferred embodiments of the present invention will now be described. These embodiments will be described with reference to the use of the present invention for XML parsing, although as discussed above and as will be appreciated by those skilled in the art, the present invention is not limited to nor exclusively suitable for XML parsing.

As is known in the art, an important task of an XML processor is to check if an XML document is "well-formed": documents that are not well-formed should be discarded immediately without any further processing. A well-formed XML document follows the XML syntax rules.

An example of an XML document is:

```
<?xml version="1.0"?>
<!--comment-->
<doc>
   <greeting>Hello!</greeting>
   <empty/>
</doc>
```

As is known in the art, in this document, <doc> and <greeting> are start tags and </doc> and </greeting> are end tags. An element is comprised of a start tag, a corresponding end tag, and everything in between. <empty/> is a so-called empty element. In a well-formed XML document, elements should not overlap, for example, <doc><greeting> Hello! </doc> </greeting> is not legal XML Other XML rules that may need to be tested to determine if an XML document is well-formed include checking to see if valid XML names are being used, attribute values are quoted, etc.

The well-formedness (or otherwise) of an XML document is usually determined by parsing the document. As discussed above the present invention provides a new and improved system for, inter alia, parsing XML documents.

Figure 1:
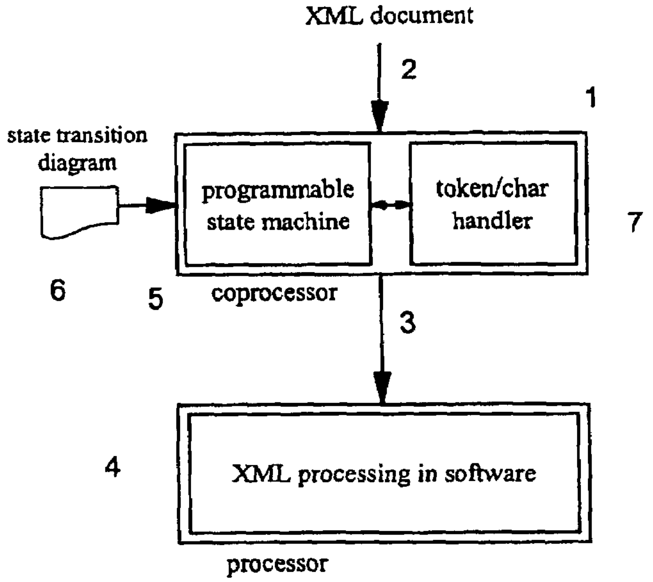
FIG. 1 shows schematically an embodiment of an XML parsing system that is in accordance with the present invention.

FIG. 1 shows schematically an XML parsing system in accordance with the present invention. The system includes a pattern-matching system 1 that is in accordance with the present invention that receives an input stream 2 of characters corresponding to the XML document to be parsed, and provides an output 3 in the form of an XML document for subsequent processing in software by a processor 4.

As shown in FIG. 1, the pattern matching system 1 includes two main components, a controller in the form of a programmable state machine 5, which is programmed with an appropriate state transition diagram 6, and a character processing unit 7 in the form of a token and character handler. As will be explained further below, the programmable state machine 5 controls the character processing unit 7 to, e.g., compare characters in the input character stream 2 with other received or stored characters. The character processing unit 7 then provides feedback to the programmable state machine 5, e.g., as to whether the compared characters match, so that the programmable state machine 5 can then parse the received document accordingly.

Figure 2:
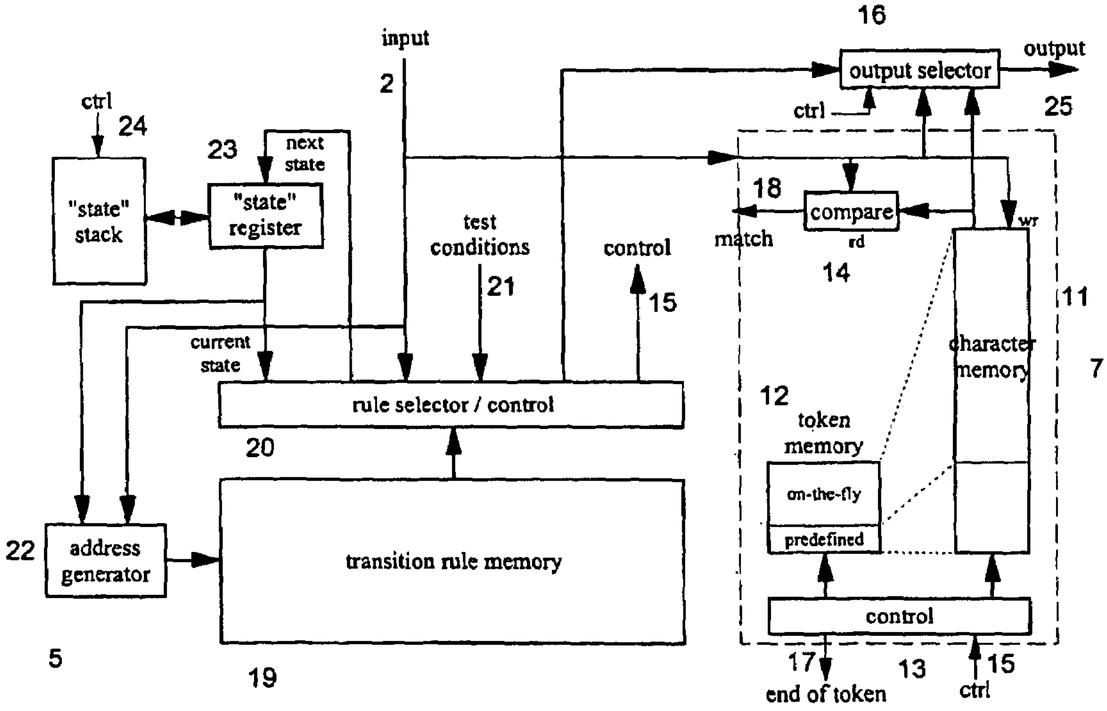
FIG. 2 shows schematically the pattern-matching system of FIG. 1.

FIG. 2 shows schematically the pattern-matching system 1 in more detail. As shown in FIG. 2, the input character string 2 is provided as both an input to the rule selector/control unit 10 of the programmable state machine 5, which will be described in more detail below, and as an input to the character processing unit 7.

As shown in FIG. 2, the character string processing unit 7 includes a character memory 11 into which characters can be written and stored and from which characters can be read out, a token memory 12, a control unit 13, and a compare unit 14.

The character memory 11 stores characters and permits the retrieval of stored characters. These can be characters written to the character memory from the input character stream "on-the-fly". The character memory also stores one or more predefined sets or strings of characters as will be explained further below.

The control unit 13 controls the operation of character processing unit 7 in accordance with control signals 15 received from the programmable state machine controller 5. The control unit 13 controls the writing of characters to the character memory 11, and the reading of characters from that memory to, e.g., provide them to the compare unit 14 and/or as an output of the character string processing unit 7 to an output selector unit 16 as will be explained further below.

The token memory 12 stores information describing which characters in the character memory make up given character strings (tokens). To do this the token memory 12 stores the start and end memory addresses of the first and last characters in each character string in association with the appropriate character string (token) identifier. This allows desired character strings to be retrieved from the character memory 11 by using the corresponding token (character string) identifier. The token memory 12 can also provide an output to the control unit 13 indicating that the end of the token (character string) has been reached, which information 17 can then be fed back to the programmable state machine 5 by the control unit 13.

The compare unit 14 is operable to compare an input character from the input character stream 2 with a stored character read from the character memory 11 and provide an output 18 to be programmable state machine controller 5 indicating whether or not there is a match.

The character processing unit 7 is operable to carry out the following functions under the control of the programmable state machine controller 5. Firstly, it can write new characters, e.g., from the input character stream 2, into the character memory 11 and combine these characters into an identifiable new character string by creating a new token specification (start/end address) in the token memory 12., Where a new character string is being created from the input character stream, the programmable state machine controller 5 will carry out the lexical analysis to convert the character stream into strings or words, as will be explained further below.

The character processing unit 7 can also retrieve and read out existing, stored character strings. This is done by controlling a read pointer that indicates the memory address currently to be read out. This can be done either by reference to the relevant token, character string, identifier, or on a last-in, first-out, LIFO, basis, which may be desirable where, e.g., it is desired to test appropriate matching of XML start and end tags. The character processing unit can also be controlled to read out particular stored characters, i.e., to select a character of the current character string (token) to be the "current" character for analysis.

The compare unit 14 can be used as discussed above to compare a character read from the character memory 11 (the "current" character) with the current input character from the input character stream 2, and provide feedback to the programmable state machine controller 5 indicating if the current read character matches the input character. The character processing unit 7 can also indicate to the programmable state machine controller 5 when the current read character is the last character of the current character string (token) being read out.

The character processing unit 7 can also provide an output indicating the type of character being tested, e.g., whether it relates to encoding, or "white space", e.g., a space, txt, line feed, line end, '\r', '\t', '\n', '', etc., whether the end of the input character stream 2 has been reached, or whether the token memory 12 is empty, i.e., there are no stored character strings (tokens) in the character memory 11 This provides the ability to use the character processing unit 7 to test that tags are well-balanced, the XML document is not abruptly ended, etc. The identification of "white space" allows more efficient processing of commonly used character values.

The programmable state machine 5 that controls the operation of the pattern-matching system 1 will now be described. As known by those skilled in the art, the programmable state machine transits or switches between particular states in which particular operations are carried out depending on the current "state" of the machine and, e.g., the current input value from the input character stream 2. The state transitions to be performed are usually determined by testing one or more state transition rules based on the current state and, e.g., the input character value.

The programmable state machine controller 5 of the present embodiment includes a transition rule memory 19 where the state transition rules, which will be described further below, that govern its operation are stored, a rule selector/control unit 20 that selects the rule to be used, and controls the system, and in particular the character processing unit 7, accordingly, based on the current input character from the input character stream 2, and the status of one or more test conditions 21.

The programmable state machine controller 5 also includes a transition rule memory address generator 22 for generating addresses to retrieve the desired transition rule from the transition rule memory 19, a state register 23 that records the current state, and a state stack 24 that can be used to store a state address for later retrieval. The operation of the latter component will be discussed further below.

As will be appreciated by those skilled in the art, the state transition rules that control the operation of the state machine 5 need to be determined and stored in the transition rule memory 19. These rules can be determined in any suitable manner.

Figure 3:
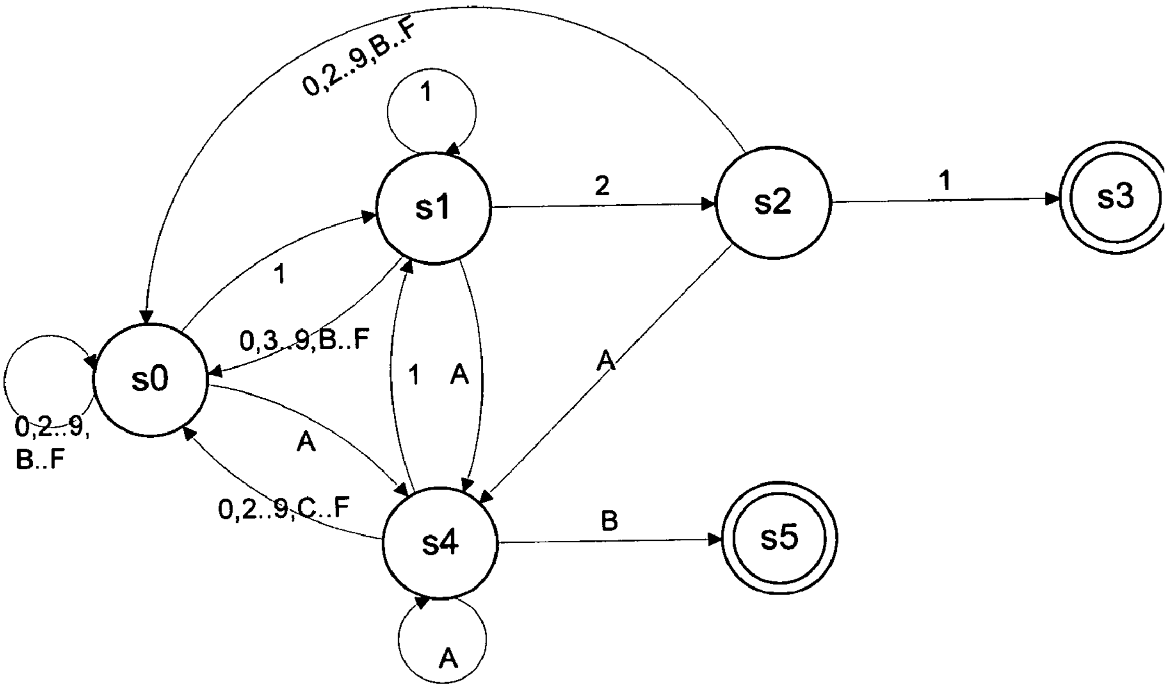
FIG. 3 illustrates a state diagram for parsing patterns from an input stream of 4-bit characters.

The principles behind the construction of a state machine suitable for this purpose will now be described with reference to FIGS. 3 and 4, which illustrate the construction of a state machine for parsing two patterns "121h", (h means hexadecimal) and "ABh" from an input stream of 4-bit characters. This state machine is described to illustrate principles behind the present embodiment, although as will be appreciated by those skilled in the art, a practical implementation of the present invention will typically involve a much more complex state machine, although the same basic principles apply to its design and construction FIG. 3 shows a state diagram for detecting the first occurrence of either a pattern "121h" (h means hexadecimal) or a pattern "ABh" from an input stream of 4-bit characters. There are 6 possible states (S0, S1, S2, S3, S4, S5) represented by circles: the arrows represent the state transitions. Nodes S3 and S5 are end states.

FIG. 4 shows an implementation of a programmable state machine for the state diagram of FIG. 3, which requires one memory access per state transition. In this example the states are assigned the following 3-bit state vectors:

| |
|---|
| S0 - 000b |
| S1 - 001b |
| S2 - 010b |
| S3 - 011b |
| S4 - 100b |
| S5 - 101b |

In FIG. 4 the current state (3 bits) concatenated with the 4-bit input value is used as an offset (address) into a table containing the next state for each possible combination of a current state and input value, as is known in the art.

The state transition rules for use in the programmable state machine controller 5 could be derived as discussed above with reference to FIGS. 3 and 4. However, in the present embodiment, the state transition rules are determined in accordance with the Applicants' earlier programmable state machine invention the subject of European patent application No. 02368098.6 filed on 12 Sep. 2002.

Figure 5:
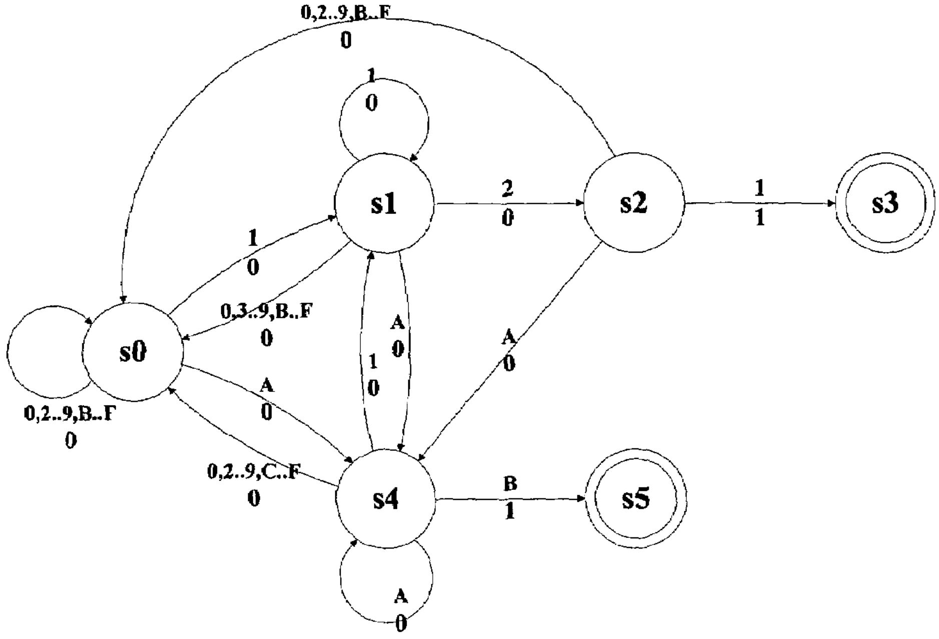
FIG. 5 illustrates a state diagram for parsing patterns from an input stream of 4-bit characters.

This state transition rule derivation process will now be described with reference to FIGS. 5 to 9. The process will be described for the exemplified, relatively simple state transition diagram shown in FIG. 3 and discussed above. FIG. 5 shows this state transition diagram and the corresponding state transition table. However, as discussed above, and as will be appreciated by those skilled in the art, the same principles can be applied to generate a suitable set of state transition rules for any desired state diagram.

In essence, the data structure for controlling the programmable state machine 5 is created by representing state transitions as a list of so called state-transition rules which are then stored in the transition rule memory 19. Each rule contains a ternary match condition for the combination of the current state and input value, and a next state and output value. With ternary match conditions, the matching patterns comprise bits having three possible states 0, 1 or X, X being a wild-card symbol for the "don't care" condition.

If a state-transition rule contains a ternary match condition that matches a given current state and input, then this state-transition rule is said to be matching. If multiple state-transition rules can all match the same current state and input, then these state-transition rules are assigned different priorities.

For a given current state and input value, the next state is determined by the highest-priority state-transition rule that matches the current state and input value.

In this programmable state machine, all state transitions are represented as a list of state transition rules involving match operators and priorities. This list for the state transition diagram in FIG. 5 is:

| | current state | input | | next state | output | priority |
|---|---|---|---|---|---|---|
| rule 1 | S2 | 1h | -> | S3 | 1 | 2 |
| rule 2 | * | 1h | -> | S1 | 0 | 1 |
| rule 3 | S1 | 2h | -> | S2 | 0 | 1 |
| rule 4 | S4 | Bh | -> | S5 | 0 | 2 |
| rule 5 | * | Ah | -> | S4 | 1 | 1 |
| rule 6 | * | * | -> | S0 | 0 | 0 |

('*' represents a wildcard symbol meaning "don't care")

The next state and output are determined by searching for the state transition rule with the highest priority matching the current state and input. For example, if the current state is S2 and the input equals 1 then this will match state transition rules 1, 2 and 6. State transition rule 1 is then selected because it has the highest priority.

This rule then determines that the next state will become S3 and that an output value 1 is generated. For any other state in combination with an input equal to 1, state transition rule 2 will be the highest priority matching rule, resulting in a transition to state S1 and an output value 0 being generated. Transition rule 6 will also match but is of a lower priority.

The use of wildcards and priorities in the state transition rules makes it possible to describe the entire state transition diagram of FIG. 5 using only six state transition rules, which is significantly fewer rules than the number of entries in the state transition table shown (partially) in FIG. 5.

These state-transition rules are stored as so-called state-transition rule entries, abbreviated to transition rule entries, in the state transition rule memory 19.

In use of this arrangement, the next state is determined by performing a parallel comparison of the current state and input character, against the ternary match conditions, stored as test values and test masks, in the corresponding transition rule entries. In case of multiple matches, the matching transition rule entry with the highest priority is selected. This operation would be performed for each new 4-bit input character until one of the two end states (S3 or S5) is reached.

The programmable state machine of the present embodiment is also arranged to search for the highest-priority state transition rule using a variation of the BaRT algorithm (as described in, for example, J. van Lunteren, "Searching very large routing tables in wide embedded memory," Proceedings of the IEEE Global Telecommunications Conference GLOBECOM'01, vol. 3, pp. 1615-1619, San Antonio, Tex., November 2001).

As is known in the art, the BaRT algorithm is based on a special hash function. The hash index is formed by a subset of bits from a search key segment that are selected such that the maximum number of collisions for any hash index is limited by a configurable bound N. The value of N is based on the memory access granularity to ensure that each hash table entry, containing at most N match conditions, can be read using a single memory access. Collisions for a given hash index are then resolved by at most N parallel comparisons.

This will now be illustrated using the example of the six state transition rules described above.

The following list shows the same six transition rules with the state and input values shown in binary notation.

| | current state | input | | next state | output | priority |
|---|---|---|---|---|---|---|
| rule 1 | 010b | 0001b | -> | 011b | 1 | 2 |
| rule 2 | xxxb | 0001b | -> | 001b | 0 | 1 |
| rule 3 | 001b | 0010b | -> | 010b | 0 | 1 |
| rule 4 | 100b | 1011b | -> | 101b | 0 | 2 |
| rule 5 | xxxb | 1010b | -> | 100b | 1 | 1 |
| rule 6 | xxxb | xxxxb | -> | 000b | 0 | 0 |

('x' represents a wildcard symbol meaning "don't care")

The states are encoded as 3-bit binary vectors according to:

S0-000b, S1-001b, S2-010b, S3-011b,

S4-100b, and S5-101b.

This encoding is only chosen as an example, and other forms of encoding can, as will be appreciated by those skilled in the art, be used.

Application of the BaRT algorithm involves selecting a hash index comprised of a minimum number of bit positions from the current state and input values, such that the number of collisions, i.e., the number of state transition rules that might be applicable for the actual state and input values, is limited to a bound N, for any value of the hash index.

The underlined bit position in the above list, which is the leftmost bit of the input value, is an example of a hash index, as determined using the BaRT algorithm, for which the maximum number of collisions for each index value is limited to N=4 transition rules. This can directly be seen from the following mapping of the state transition rules on the two index values:

| index | transition rules |
|---|---|
| 0b | rule 1, rule 2, rule 3, rule 6 |
| 1b | rule 4, rule 5, rule 6 |

Figure 6:
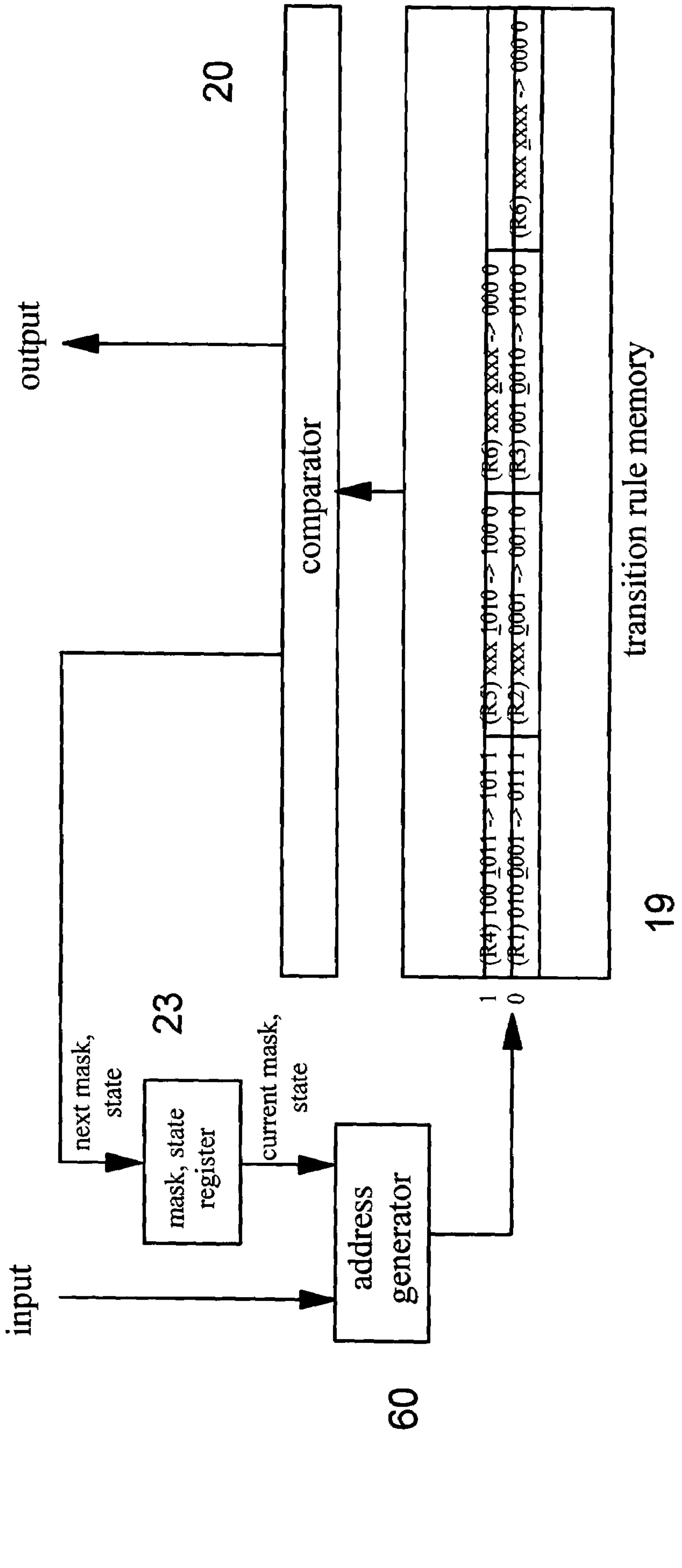
FIG. 6 illustrates a BaRT-compressed state-transition rule table which implements the state diagram of FIG. 5, and is organized such that a maximum of N=4 transition rule entries are stored in each memory location.

FIG. 6 shows the corresponding "hash table", which will be denoted as transition rule table. Each entry in the transition rule table in FIG. 6 contains at most N=4 state transition rules. An address generator 60 selects an index into the transition rule table (memory) 19 by extracting the hash index from the state and input values, based on a mask. In this example, the leftmost input bit is selected as hash index.

Figure 7:
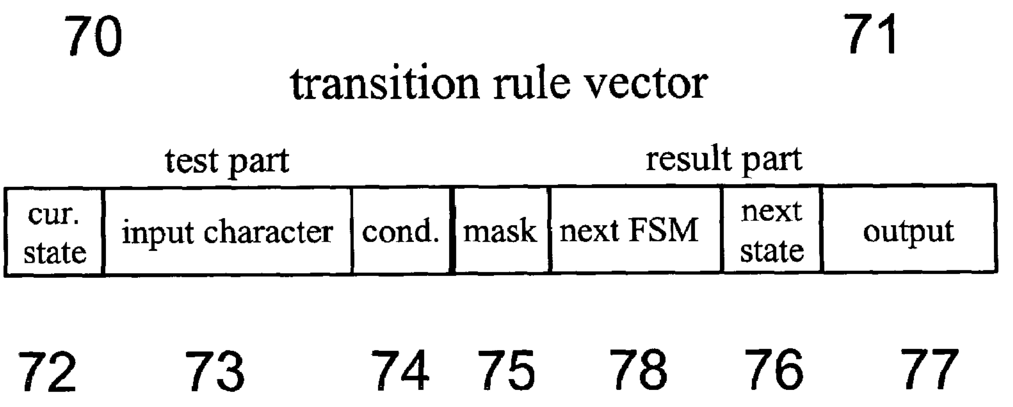
FIG. 7 illustrates the fields within an exemplary state transition rule entry.

The state transition rules are stored in the transition rule table in the form of transition rule vectors, such as the one shown in FIG. 7. Each vector contains a test part 70 and a result part 71. The test part 70 contains the match conditions for the current state 72 and input values 73. The conditions field 74 contains bit flags indicating if the current state and input values are to be compared against the current state and input fields or whether these are "don't care" (wildcard). The results part 71 contains a mask field 75 specifying the bit positions of the hash index that have to be extracted by the address generator. The results part 71 also contains two fields containing the next state 76 and output values 77 corresponding to the state transition. The "next FSM" field 78 will be discussed below.

The transition rule vectors are ordered by priority within a transition rule table entry. In FIG. 6, the priority of the transition rule vectors decreases from left to right. The width of the transition rule memory allows an entire transition rule table entry containing (at most) N=4 transition rule vectors to be read.

During the operation of the programmable state machine, the address generator 60 will generate an index into the transition rule table 19 based on the- mask, which is stored together with the state in the state register 23 The corresponding transition rule table entry is then read, and the test parts of the at most N=4 transition rule vectors are compared in parallel against the actual state and input values. The highest-priority matching transition rule vector is then selected, and the fields in its results part are then used to update the state register, including the mask value, and for generating an output.

Figure 8:
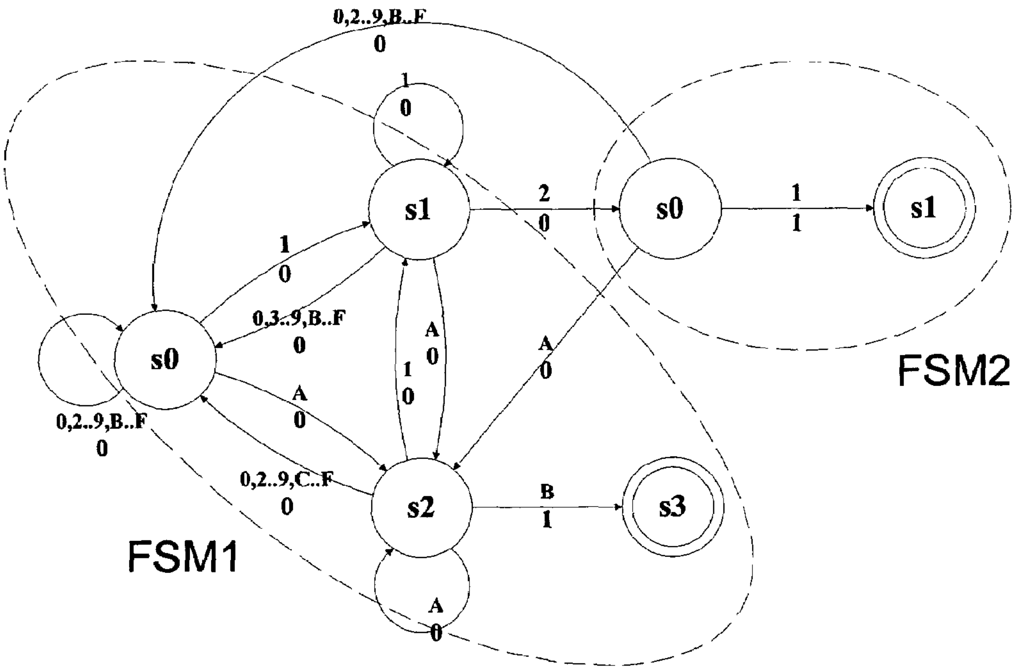
FIG. 8 shows a further refinement of the state diagram of FIG. 5.

In the programmable state machine of the present embodiment, the state transition diagram is also partitioned into multiple smaller segments. FIG. 8 shows an example of the partitioning of the state transition diagram of FIG. 5 into two segments, denoted as FSM1 and FSM2. Note that the states need to be unique only within each segment. Therefore, the states have been renamed from FIG. 5. For example, both segments FSM1 and FSM2 now contain states S0 and S1.

For each of the two state diagram segments shown in FIG. 8, a set of state transition rules can be derived as in the previous example. Because the next state can also be part of another state transition diagram segment, e.g., FSM1, FSM2, the segment to be used next is indicated by the result part of the transition rule, using the field 78 called "next FSM" shown in FIG. 7.

The following sets of transition rules can be derived for the two state transition diagram segments.

segment FSM1:

| | current state | input | | next FSM | next state | output | priority |
|---|---|---|---|---|---|---|---|
| rule 1 | * | 1h | -> | FSM1 | S1 | 0 | 1 |
| rule 2 | S1 | 2h | -> | FSM2 | S0 | 0 | 1 |
| rule 3 | S2 | Bh | -> | FSM1 | S3 | 1 | 1 |
| rule 4 | * | Ah | -> | FSM1 | S2 | 0 | 1 |
| rule 5 | * | * | -> | FSM1 | S0 | 0 | 0 |

segment FSM2:

| | current state | input | | next FSM | next state | output | priority |
|---|---|---|---|---|---|---|---|
| rule 1 | S0 | 1h | -> | FSM2 | S1 | 1 | 1 |
| rule 2 | * | Ah | -> | FSM1 | S2 | 0 | 1 |
| rule 3 | * | * | -> | FSM1 | S0 | 0 | 0 |

Figure 9:
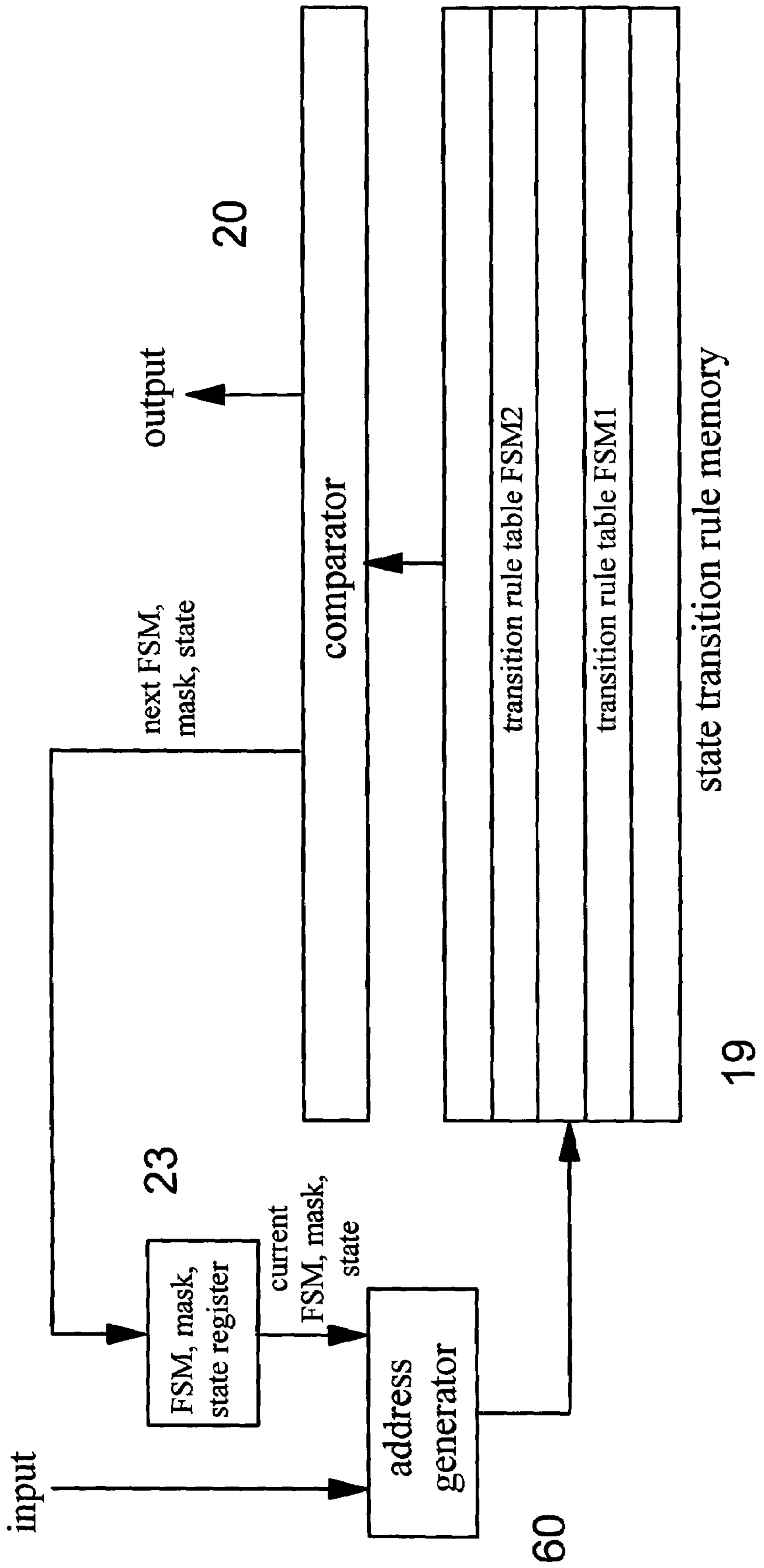
FIG. 9 illustrates a BaRT-compressed state transition rule table that implements the state diagram of FIG. 8.

For both segments, transition rule tables can be created using the BaRT algorithm as discussed above. These tables are shown in FIG. 9. The original "state" register 23 will in addition to the state vector now also store an identification of the current state transition rule segment (denoted as current FSM), and the mask (determined using the BART algorithm) identifying the bit positions comprising the hash index that is used to index the current FSM.

During operation, the current FSM value ("identification") is used by the address generator 60, either directly or indirectly, to determine the start address of the transition rule table.

The current mask value is then used to extract bits from the current state and input in order to form a hash index into the selected transition rule table which is then added to the start address mentioned above. Next, the entire selected (indexed) transition rule table entry is retrieved (read) and provided to the comparator logic 20. After the comparator logic 20 has determined the highest-priority matching transition rule, the corresponding fields are used to update the current state, FSM, i.e., state machine segment, and mask values.

With this arrangement, all states are distributed over smaller state spaces and assigned state vectors that are unique within each state space. This can facilitate, e.g., the more efficient support of state machines with large numbers of states.

The present embodiment further uses an improved state encoding step, which allows the actual logic that implements the extraction of the hash index bits based on a mask as described above to be simplified. This can be illustrated using the following example of six state transition rules.

| | current state | input | | next state | output | priority |
|---|---|---|---|---|---|---|
| rule 1 | s1 | 1h | -> | s2 | 1 | 1 |
| rule 2 | s2 | 2h | -> | s3 | 1 | 2 |
| rule 3 | s2 | * | -> | s2 | 0 | 1 |
| rule 4 | s3 | Ah | -> | s4 | 1 | 1 |
| rule 5 | s4 | * | -> | s5 | 0 | 1 |
| rule 6 | s5 | 0h | -> | s1 | 0 | 1 |

('*' represents a wildcard symbol meaning "don't care")

As above, the states are first encoded as 3-bit binary vectors according to:

S1-001b, S2-010b, S3-011b, S4-100b, and

S5-101b.

This results in the following list of rules, now shown in binary notation:

| | current state | input | | next state | output | priority |
|---|---|---|---|---|---|---|
| rule 1 | 001b | 0001b | -> | 010b | 1 | 1 |
| rule 2 | 010b | 0010b | -> | 011b | 1 | 2 |
| rule 3 | 010b | xxxxb | -> | 010b | 0 | 1 |
| rule 4 | 011b | 1010b | -> | 100b | 1 | 1 |
| rule 5 | 100b | xxxxb | -> | 101b | 0 | 1 |
| rule 6 | 101b | 0000b | -> | 001b | 0 | 1 |

('x' represents a wildcard symbol meaning "don't care")

The two underlined bit positions in the above list, which are the leftmost and rightmost bits of the state value, are an example of a hash index, as determined using the BaRT algorithm, for which the maximum number of collisions for each index value is limited to N=2 transition rules, the value of N=2 is used for exemplary purposes only This can directly be seen from the following mapping of the state transition rules on the four index values:

| index | transition rules |
|---|---|
| 00b | rule 2, rule 3 |
| 01b | rule 1, rule 4 |
| 10b | rule 5 |
| 11b | rule 6 |

In order to extract the hash index in this example, two bits from non-adjacent locations have to be extracted and concatenated. This procedure can be simplified by using a different state encoding, such that all bit positions that are part of the hash index, are at consecutive positions, either left or right aligned within the state vector.

For example, if in the above state encoding (S1-001b, S2-010b, S3-011b, S4-100b, and S5-101b), the left and middle bits would be "swapped", this would result in the following encoding:

S1-001b, S2-100b, S3-101b, S4-010b, and

S5-011b.

The above list of state transition rules now becomes:

| | current state | input | | next state | output | priority |
|---|---|---|---|---|---|---|
| rule 1 | 001b | 0001b | -> | 100b | 1 | 1 |
| rule 2 | 100b | 0010b | -> | 101b | 1 | 2 |
| rule 3 | 100b | xxxxb | -> | 100b | 0 | 1 |
| rule 4 | 101b | 1010b | -> | 010b | 1 | 1 |
| rule 5 | 010b | xxxxb | -> | 011b | 0 | 1 |
| rule 6 | 011b | 0000b | -> | 001b | 0 | 1 |

('x' represents a wildcard symbol meaning "don't care")

The bits that form the hash index can now be extracted in much simpler way from the state vector, for example, by performing a mask operation, e.g., bitwise AND operation with a vector 011b—in this example, on the state value.

In the present embodiment of the present invention, the techniques described above are used to create a data structure for the programmable state machine controller 5 to provide a set of state transition rules for pattern-matching an input character stream and controlling the character processing unit 7.

In order to allow the programmable state machine controller 5 to control and respond to the outputs of the character processing unit 7, the above programmable state machine data structure is further modified as set out below. These changes allow the programmable state machine controller 5 to more efficiently control the pattern-matching system.

Firstly, the state transition rules are modified from the structure shown in FIG. 7.

Figure 10:
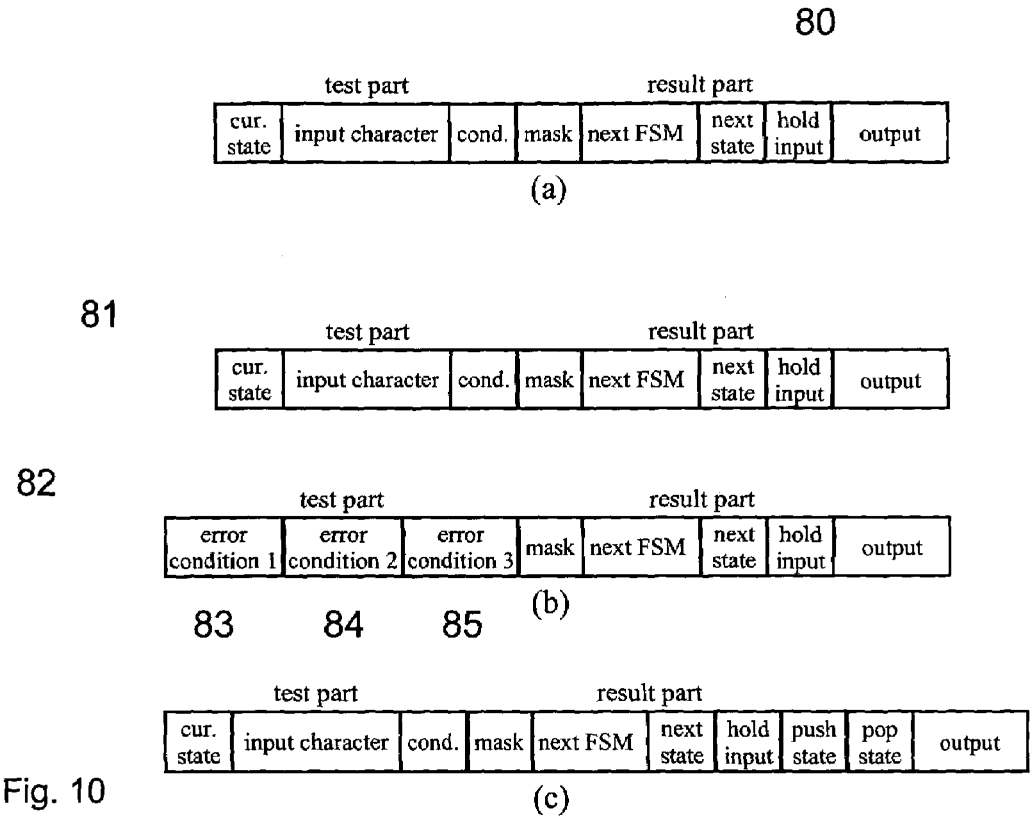
FIG. 10 shows a number of state transition rule formats in accordance with embodiments of the present invention.

The first such modification involves the addition of an instruction to the transition rule vector for controlling the input character stream. This is shown in FIG. 10(*a*). The field "hold input" 80, which will typically consist of a single bit, indicates whether the input stream should either be halted or that the next character in the stream should be provided as input. This option has two important applications: it allows the same input character to be used for processing in multiple consecutive cycles, e.g., for selecting state transition rules; and it allows the input stream to be kept on hold during the executing of functions that last multiple cycles.

The second modification involves the use of multiple types of transition rule vectors, each type involving different test parts. FIG. 10(*b*) gives an example of two transition rule vectors with different test parts. The upper transition rule vector 81 has a test part involving, inter alia, the current state and input character as discussed before. The lower transition rule vector 82 has a different test part comprised of three error conditions. These error conditions could for example relate to stack and memory overflow situations.

In use of these state transition rules, the rule selector will still determine the highest-priority matching transition rule as described before. However, in order to determine if a rule is matching, different conditions will be evaluated dependent on the test part of the transition rule. These arrangements of the state transition rules can be used, e.g., to force the programmable state machine to make a transition into a certain error state upon the occurrence of a certain error condition, regardless of the current state and input character.

Figure 11:
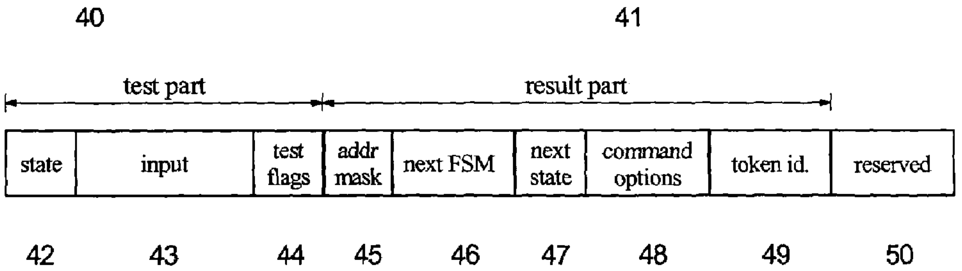
FIGS. 11 and 12 show preferred embodiments of the structure of the state transition rules used in the pattern-matching system of FIG. 2.
Figure 12:
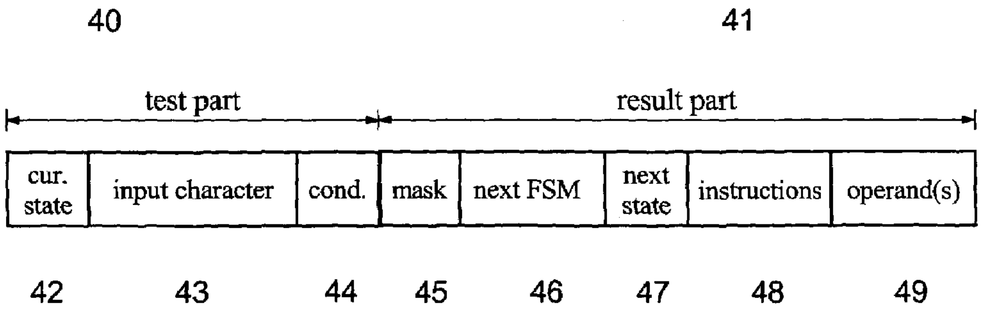

The state transition rule vector structure is further modified as shown in FIGS. 11 and 12 to, in particular, allow the programmable state machine controller 5 to control the character processing unit 7.

As shown in FIGS. 11 and 12, each state transition rule is similar to those shown in FIG. 10 and includes a test part 40 and a result part 41, and a reserved bits field 50

The test part 40 includes test fields for the current state 42, and the current input character 43, as discussed above, and a test flag or condition field 44.

The test flag or condition field 44 is used to set several conditions to test the results provided by the character processing unit 7. As shown in FIGS. 11 and 12, the test flag or condition field 44 can be set in the current embodiment to indicate that the state machine controller 5 is testing the current state, testing the current input character, testing whether the current input character matches the current character from the character processing unit 7 and it is the end of the current character string, whether the current input character matches the current character from the character processing unit 7 and it is not the end of the current character string, whether the end of the input character stream 3 has been reached, whether the character processing unit 7 token memory 12 is empty, or under or overflowing, testing character or string compare or search results, testing character information, e.g., white space, valid character name, values, etc.

The result part 41 of the state transition rule includes an address mask field 45, a next state machine field 46, for use where, as discussed above, the overall state diagram is divided into plural smaller, individual finite state machine spaces, a next state field 47, a command options or instructions field 48, and an operand field 49, which in FIG. 11 is in the form of a token (character string) identification field.

The instructions or command field 48 and the operand field 49 together correspond to the output field shown in FIG. 10. These fields store the instructions and commands and corresponding operands (if needed) for controlling the character processing unit 7. Both fields can be encoded if desired.

In the present embodiment, the command option or instructions field 48 can be used to set the programmable state machine controller 5 to carry out a number of functions depending on the results of its testing of the current state, input character and test state. In the present embodiment the command option field 48 can include commands to add (push) and remove (pop) the current state to and from the state stack 64 (this will be explained further below), to "combine" characters into strings, to store, retrieve, compare, or search characters or strings, and/or commands relating to encoding, conversion, output generation, etc.

The operand field 49 is used in conjunction with the command option field 48 and is used, e.g., to indicate the token, i.e., character string, identity to be used by the character processing unit 7 when the command field 48 contains, e.g., a command relating to a character string (token) which accordingly needs to be identified in some way.

The command field 48 can also include commands controlling the output of the system, for example, to output the current input character, to output a character from the character memory 11 of the character processing unit 5, to output other information such as a field from the state transition rule vector, or to provide no output at all. This will be discussed further below.

The command option field 48 can also include a command, as discussed above, to "hold" the current input character.

As well as the state transition rules being modified as discussed above, the programmable state machine controller 5 is further modified by the inclusion of a state stack 24 for storing state space addresses, as shown in FIG. 2.

This is facilitated by, as discussed above, including as one command option in the state transition rules of the present embodiment the option of storing the current state space address and state register value in, and retrieving the current state space address and state register value from, the state stack 24. This is facilitated by the addition of two instructions, "push state" and "pop state", typically implemented as two bit fields, to the result part of the transition rule vector as shown, for example, in FIG. 10(*c*).

Although not shown explicitly, the state register 23 will also store the current FSM, i.e., state diagram segment, and mask values in addition to the current state as described above. Furthermore, the state stack 24 will also store the FSM and mask values in addition to the state value.

This arrangement allows the state machine controller 5 to invoke certain parts of the state diagram with a form of procedure call, in a similar manner to conventional general-purpose processors. If a transition rule vector is "executed"

which includes a "push state" instruction, then the contents of the state register will be stored on the stack 24. Next some part of a state transition diagram can be "walked through" ("executed") that comprises the procedure that is invoked. Finally, if a transition rule vector is "executed" which includes a "pop state" instruction, then the state that is on top of the stack 24 will be written into the state register, so that the process moves to that state.

Variations on this mechanism that could be used in the present embodiment include the possibility of selecting the state that is returned to, i.e., the state that is "pushed" on the stack, such that for example, it need not be the original state from which the procedure "call" was made, but could be some other state, such as the state register contents plus one, at the time the "procedure" is called. This selection preferably relates only to the actual state; the FSM and mask are preferably pushed unmodified on the stack.

This arrangement is used to allow the state machine 5 to "branch" to subset or subroutine of states/transitions from its current location and to then be returned to its original, or another, location by retrieving the stored state space address and storage register value from the state stack 24. In this way, a single common set of states/transitions can be invoked as a procedure from different locations in the state diagram, even in a recursive way.

The pattern-matching system of the present embodiment shown in FIG. 2 further includes an output selector unit 16 that is used to control the overall output 25 of the parsing system. The output selector 16 receives as inputs the input character stream 2, an output from the programmable state machine controller 5, and an output from the character memory 11 of the character processing unit 7. It is operable to provide any of these inputs to the output stream 25, and does so under the control of the programmable state machine controller 5, using the command option field in the state transition rules.

In the present embodiment, the output selector 16 is operable to provide as an output 25, either the current character from the input character stream 2, the current character being read from the character memory 11 of the character processing unit 7, information generated by the programmable state machine controller 5, such as a field from the current state transition rule vector, or no output at all. These output options allow the output character stream 25 to, e.g., correspond to the input character stream 2 but with certain characters or character strings replaced, and/or to be a selected or filtered portion of the input character stream. Such functions may be useful where, e.g., it is desired to filter certain information from the input character stream, and/or to add character strings to or modify character strings in the input character stream, etc. Such latter functions may be useful where, e.g., it is desired to translate an input XML document into HTML.

An example of the operation of the present embodiment of the present invention will now be described with reference to FIGS. 13 to 38. This example will be given in the context of parsing an XML document starting with the following two lines:

```
<?XML version="1.0"?>
<!doctype . . .
```

It will be assumed that this document is provided as the input character stream 2 to the pattern matching system 1 of FIG. 1.

In FIGS. 13 to 38, the pattern matching system 1 of the present invention is shown schematically by means of a state diagram 60 that corresponds to the state diagram that the programmable state machine controller 5 is programmed to recreate. The character processing unit 7 is shown with its relevant components as in FIG. 2.

Figure 13:
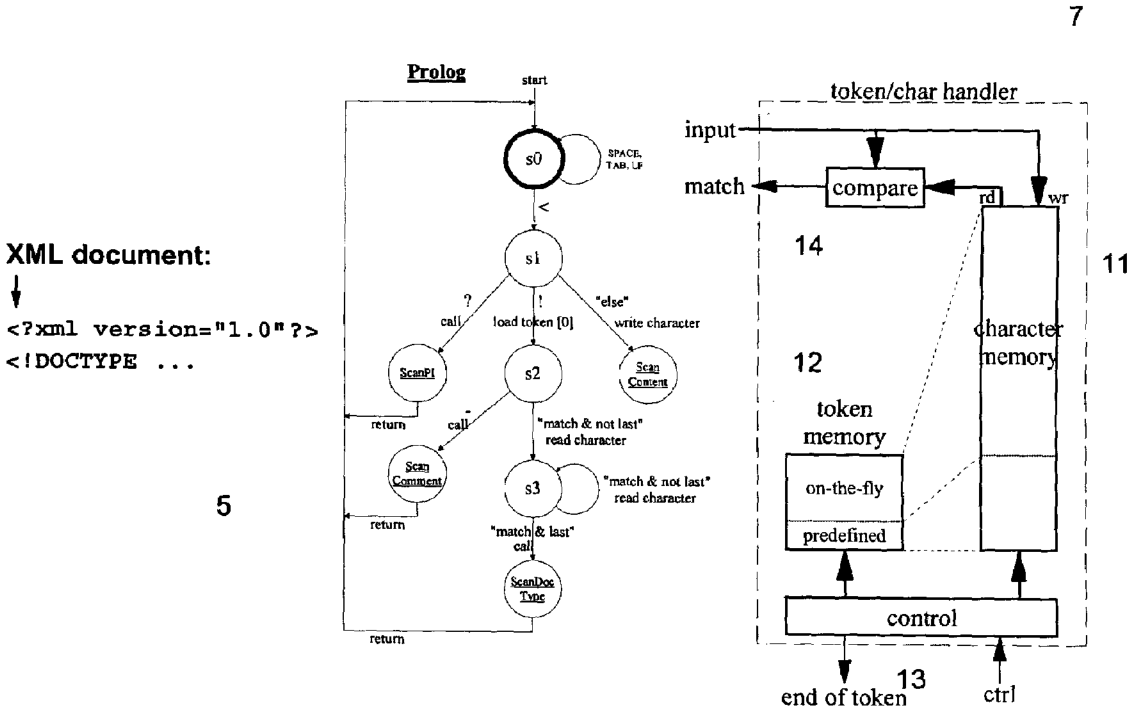
FIGS. 13 to 38 show schematically the operation of a preferred embodiment of the pattern-matching system of FIG. 2.
Figure 14:
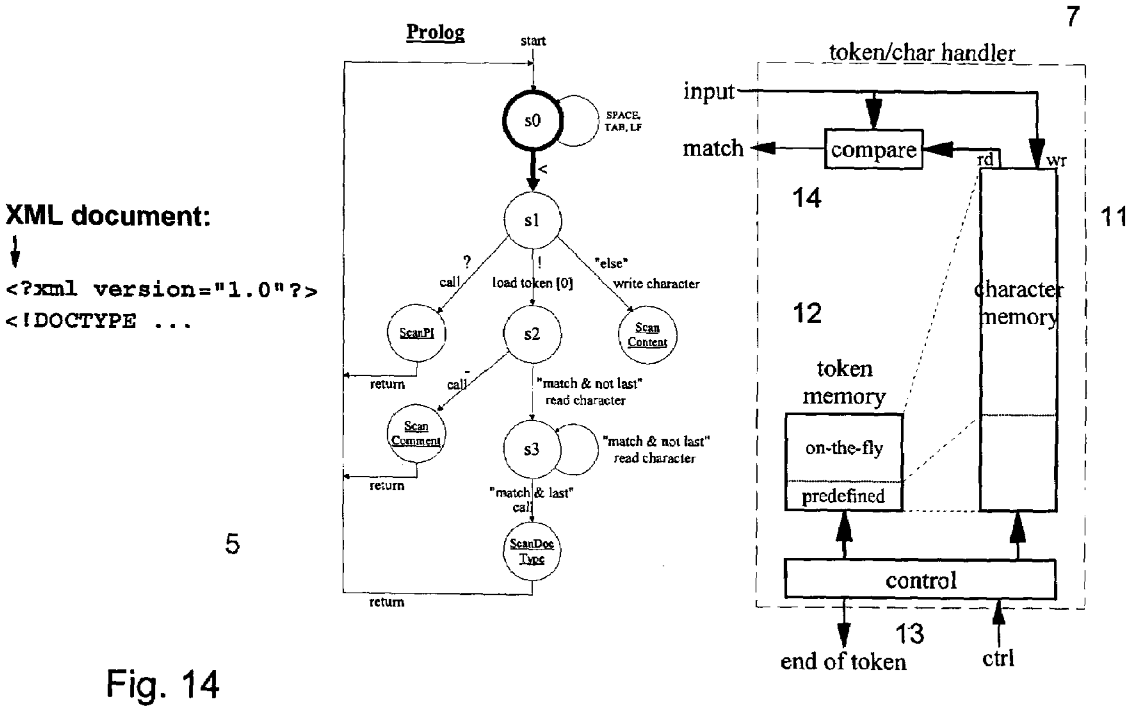
Figure 15:
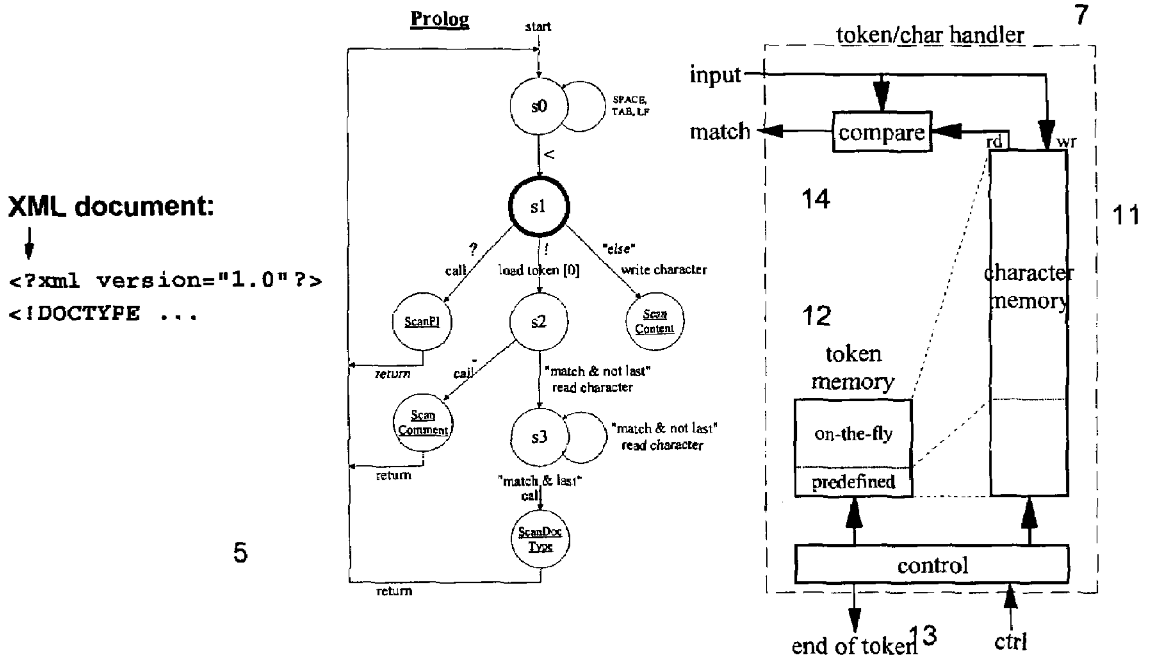
Figure 16:
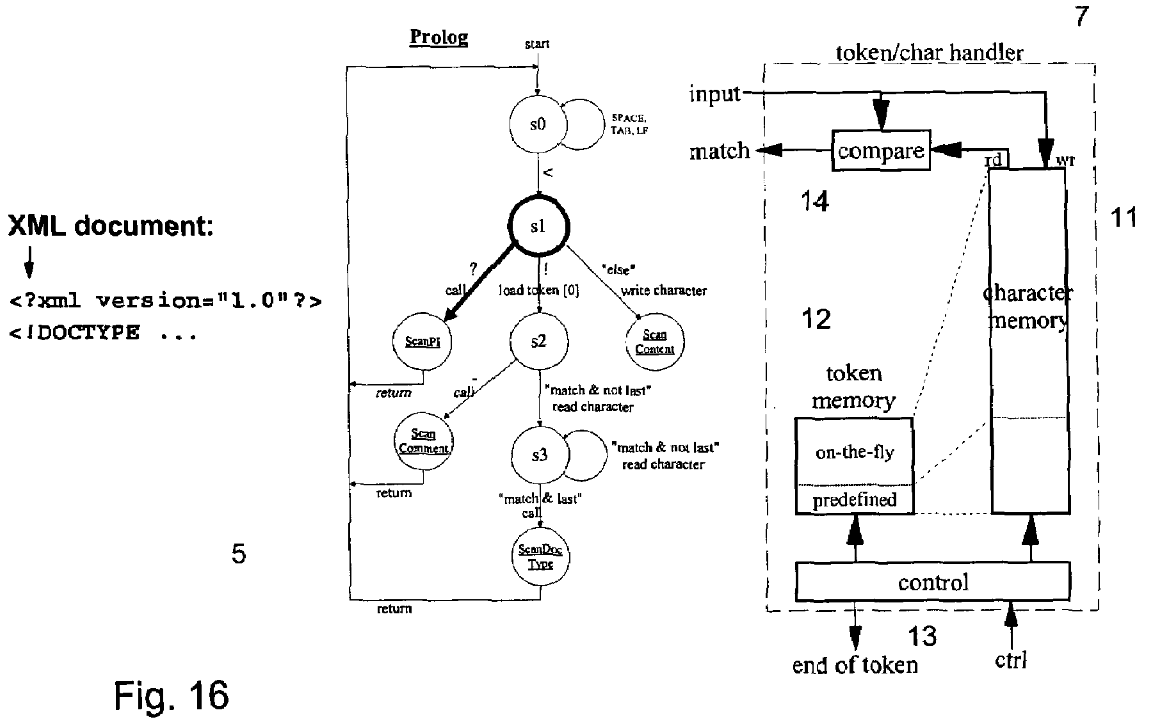
Figure 17:
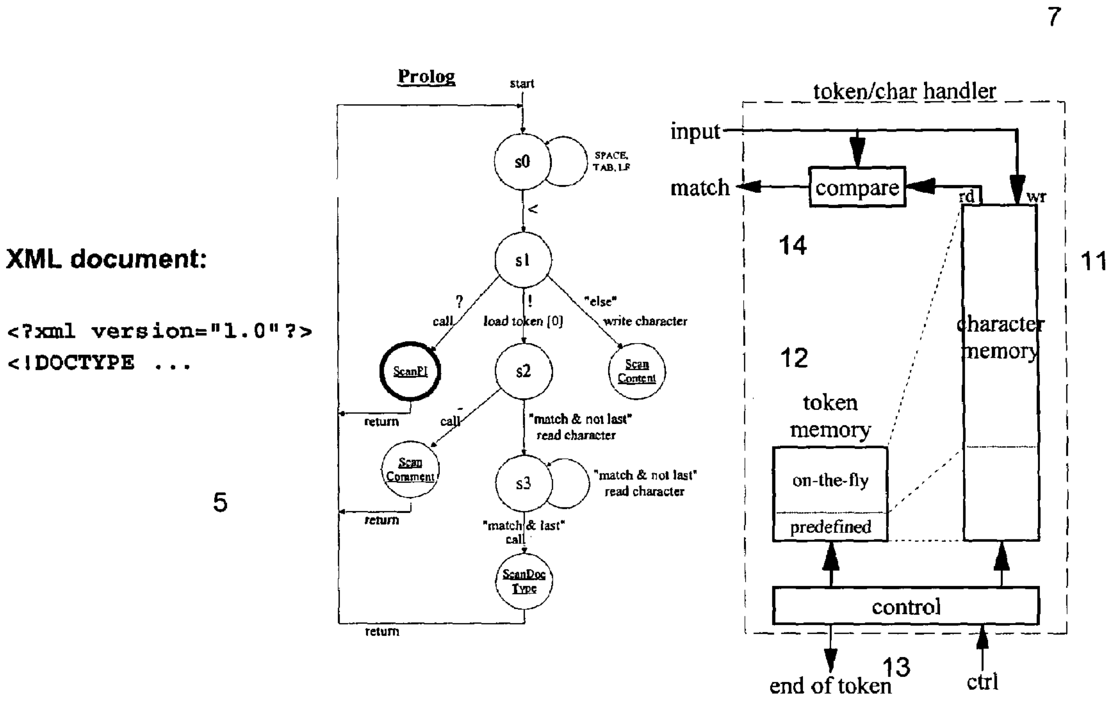
Figure 18:
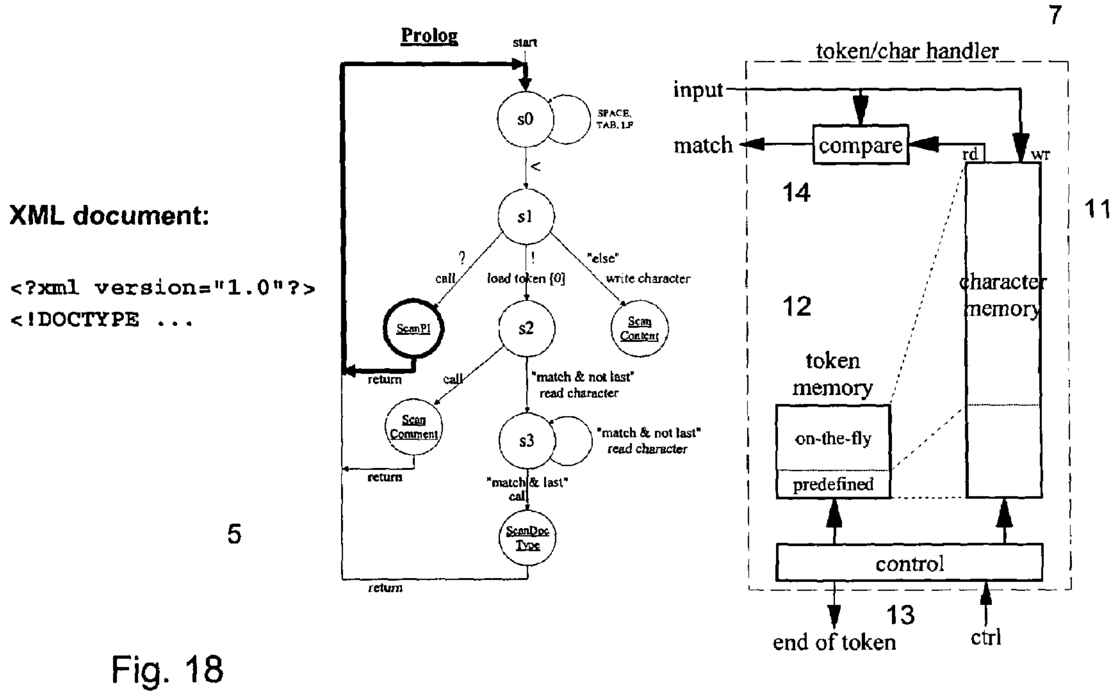

As shown in FIG. 13, the system remains in the state SO until such time as the input character is recognized as being "<", at which point the system moves to state S1. This is shown in FIG. 14.

In state S1, there are three possible output next states depending upon the input character. If the input character is "?", then a subprocedure of the state machine "ScanPi" (not shown) is carried out at the end of which the system returns to state S0. The ScanPI procedure is a procedure for scanning the processing instruction and in this embodiment "reads" the input until a closing character string "?>" is encountered, at which point the system returns to state S0

If the input character is "!", then the character processing unit 7 is commanded to load a token (character string) having the identifier "0" and the system moves to state S2.

For any other input character in state S1, i.e., in practice when the first character of an element tag, either start tag or empty element tag, is encountered, the system proceeds to the "ScanContent" procedure (not shown) which is another segment of (state space within) the overall state diagram. This "ScanContent" procedure writes the characters into the character memory and will parse the remainder of the, e.g., element name and the remaining XML document.

In the present example, after the character "<", the next character is "?", and so the system proceeds to call the ScanPi routine and then returns to state S0 as shown in FIGS. 15 to 18.

Figure 19:
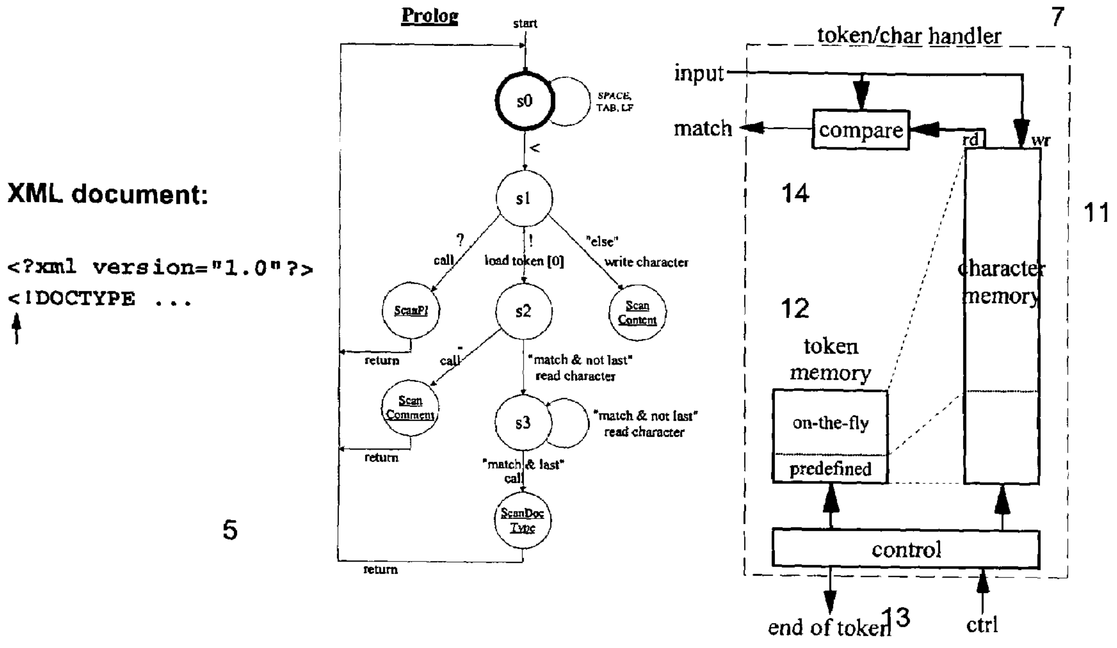
Figure 20:
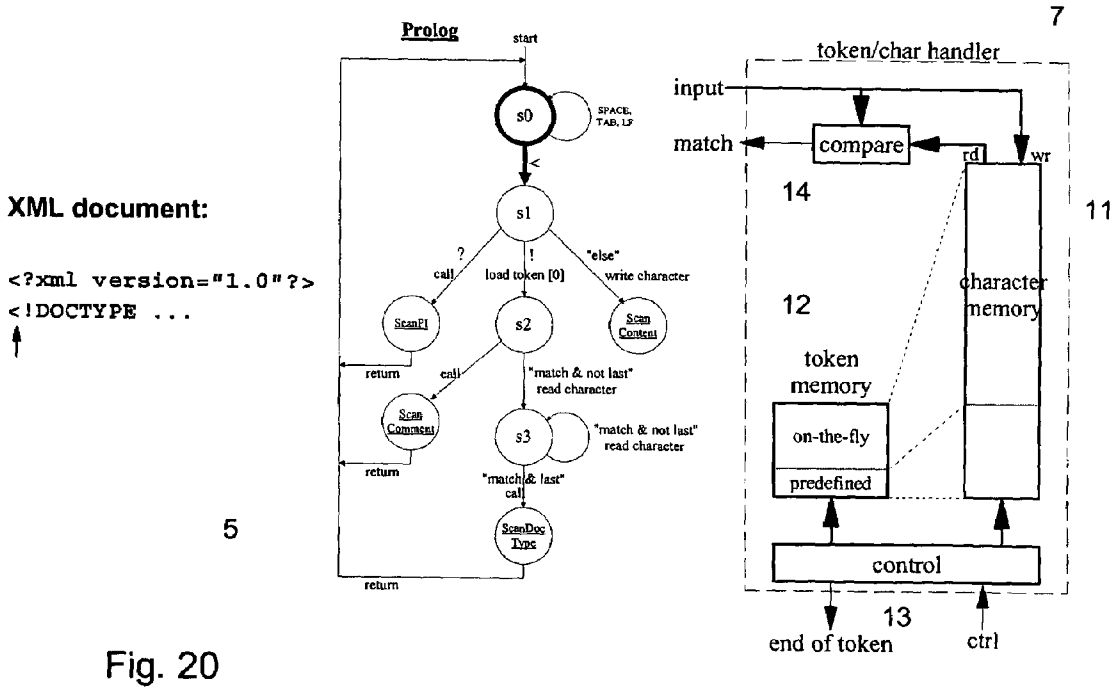
Figure 21:
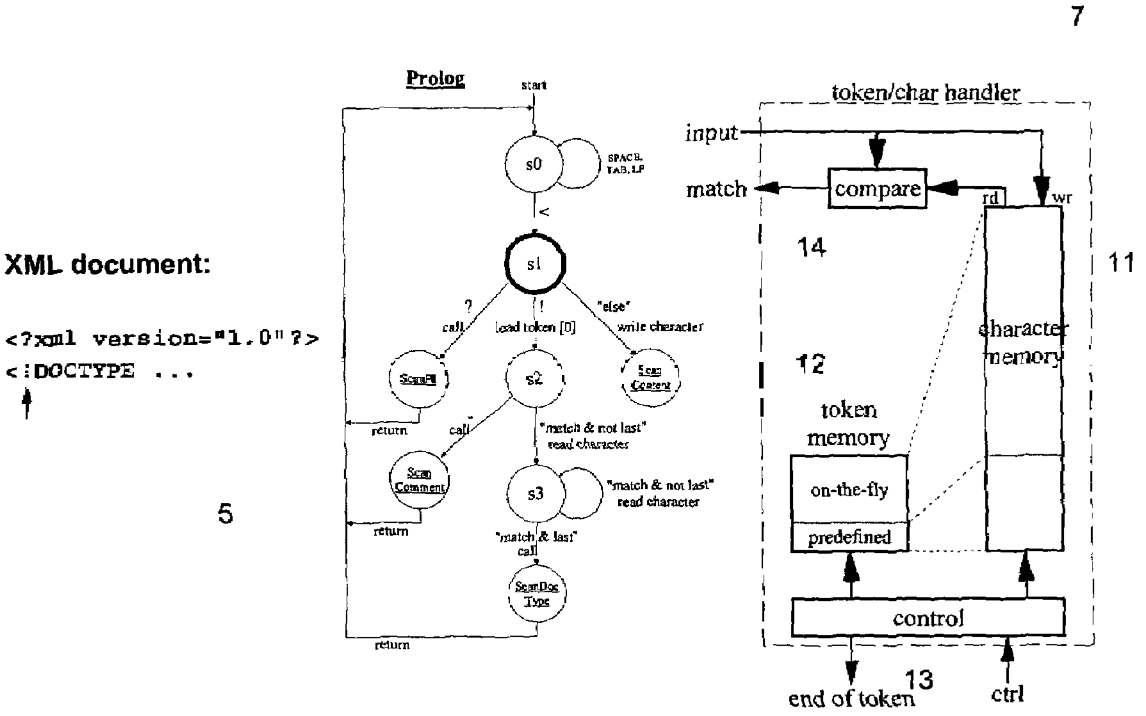
Figure 22:
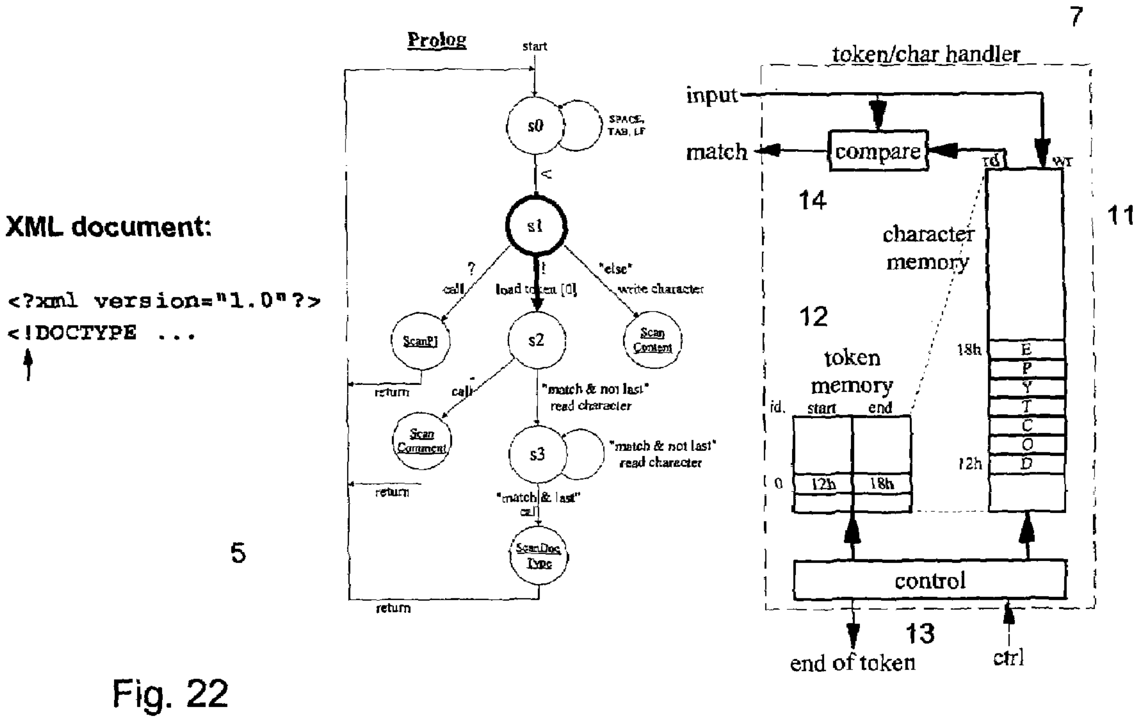

The system then again remains in state S0 until the next "<" character is received in the input stream, as shown in FIGS. 19 and 20. The system is then again in state S1, but in this case the next character is "!", and so a command is sent to the character processing unit 7 to select the token (character string) having the identity "0" as the "current" token and to select the first character of this string as the "current" character. Thus the character processing unit 7 is arranged to identify and be able to read the character string having the identifier "0" from the character memory 11. As shown in FIG. 22, this is done by retrieving the start and end addresses of the character string having the identifier "0" from the token memory 12. As shown in FIG. 22, in this example that character string has a start address 12H and an end address 18H and is for the character string "DOCTYPE".

The system is now in state S2, which has two possible next states, to call the "ScanComment" procedure if the next input character is "–", or to proceed to state S3 if the current input character from the input character stream matches the currently read character from the character memory 11 and that character is not the last character in the indicated character string (token).

Figure 23:
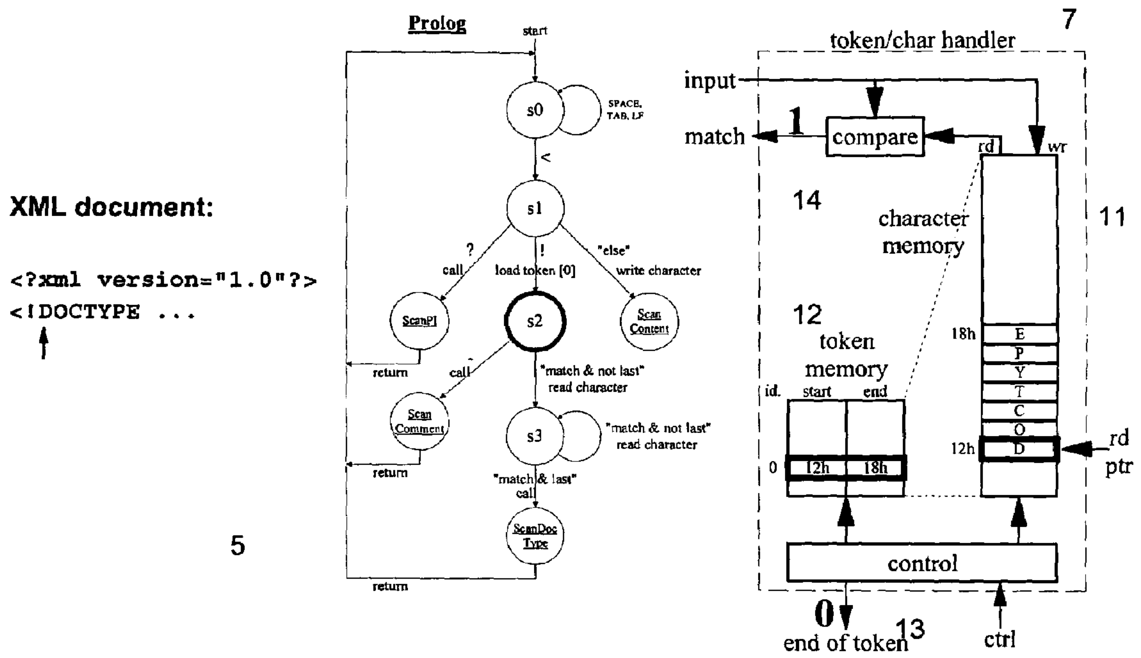

Thus in the present case, as shown in FIG. 23, at state S2, the read pointer of the character memory 11 is set to the start address for the identified token "0", and that character is compared by the compare unit with the current input character and the output of that result returned to the programmable state machine controller 5, which in this case would be a match, since the character "D" in the input character stream matches the character "D" stored for the start memory address 12H of the token "0"

Figure 24:
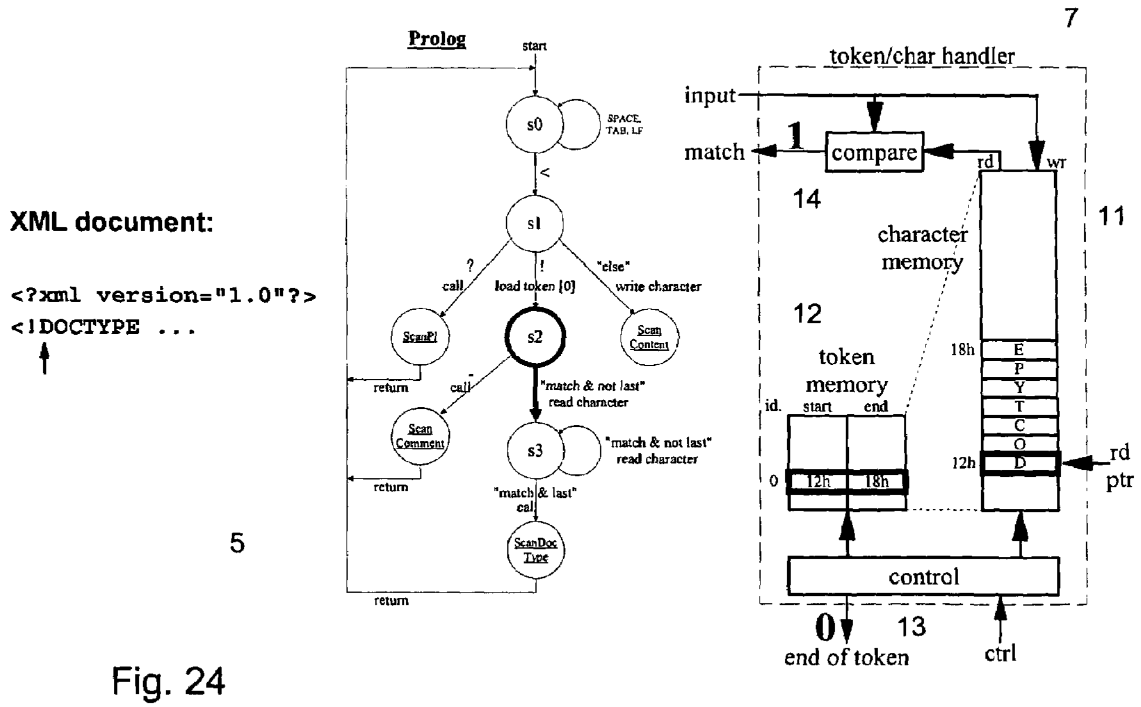
Figure 25:
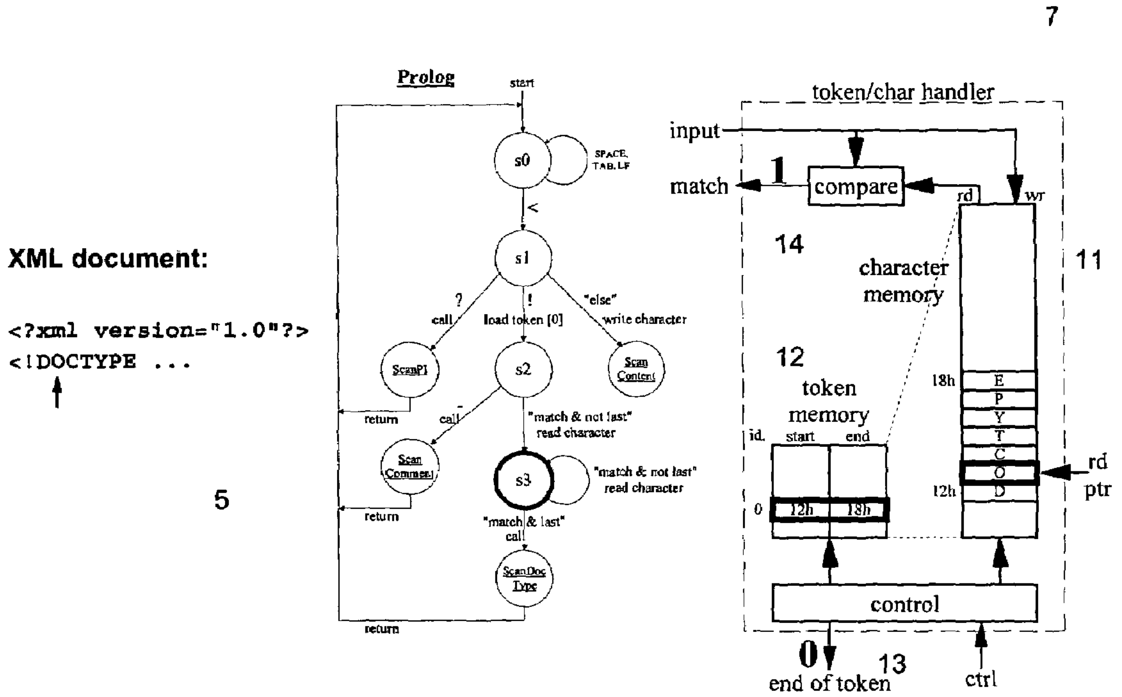
Figure 26:
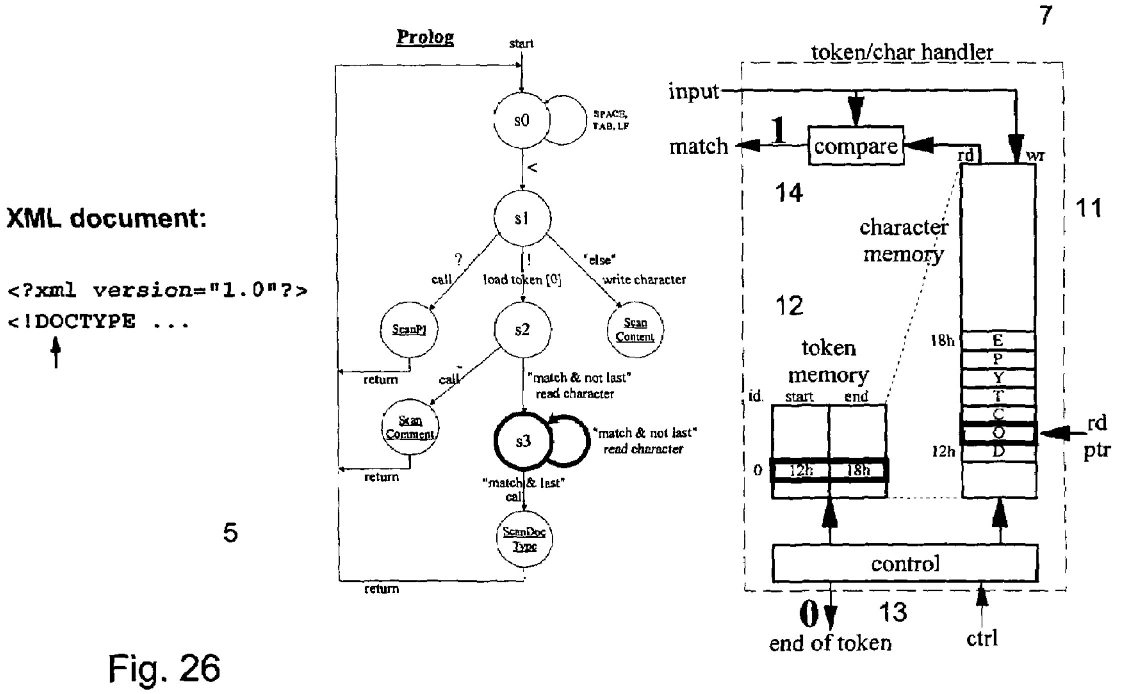
Figure 27:
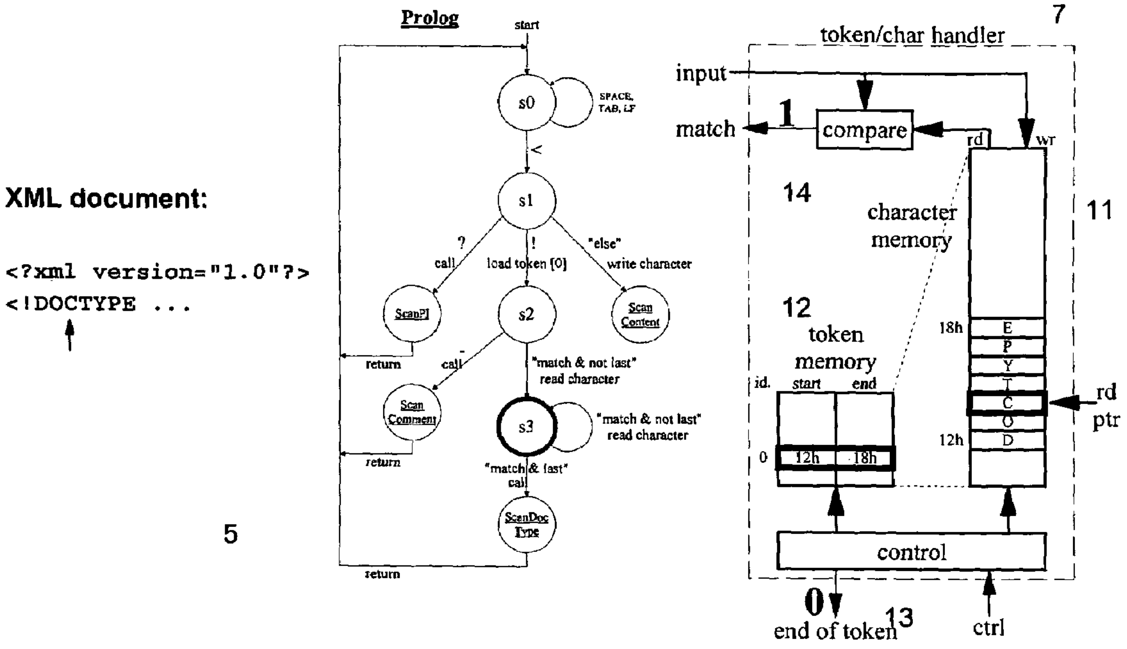
Figure 28:
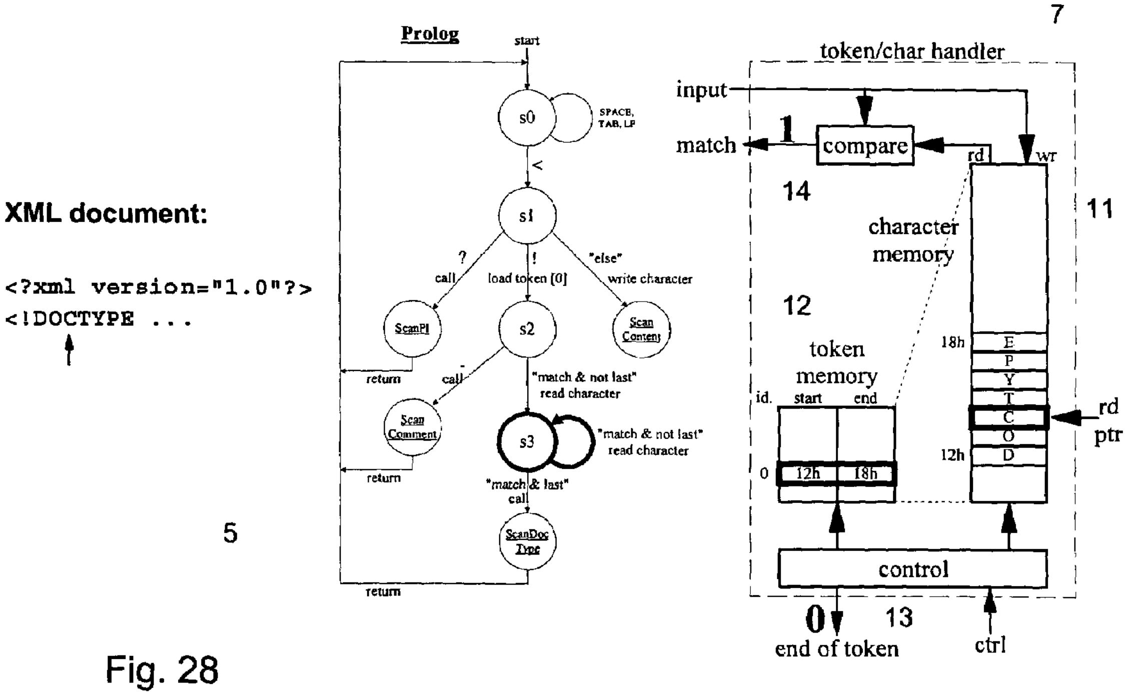
Figure 29:
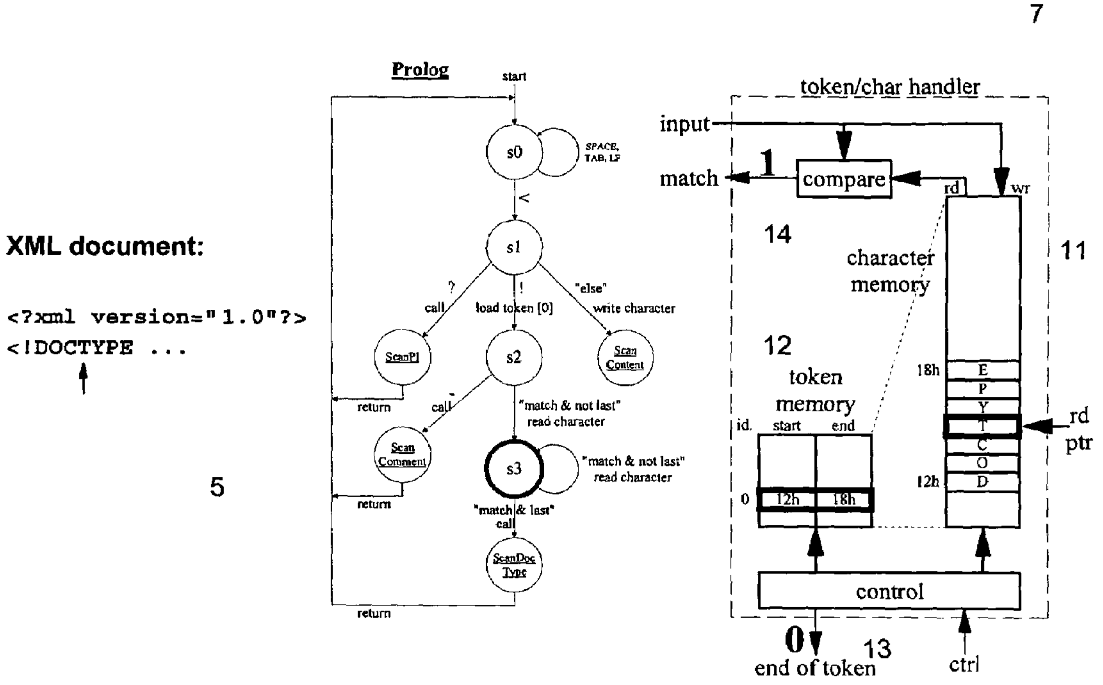
Figure 30:
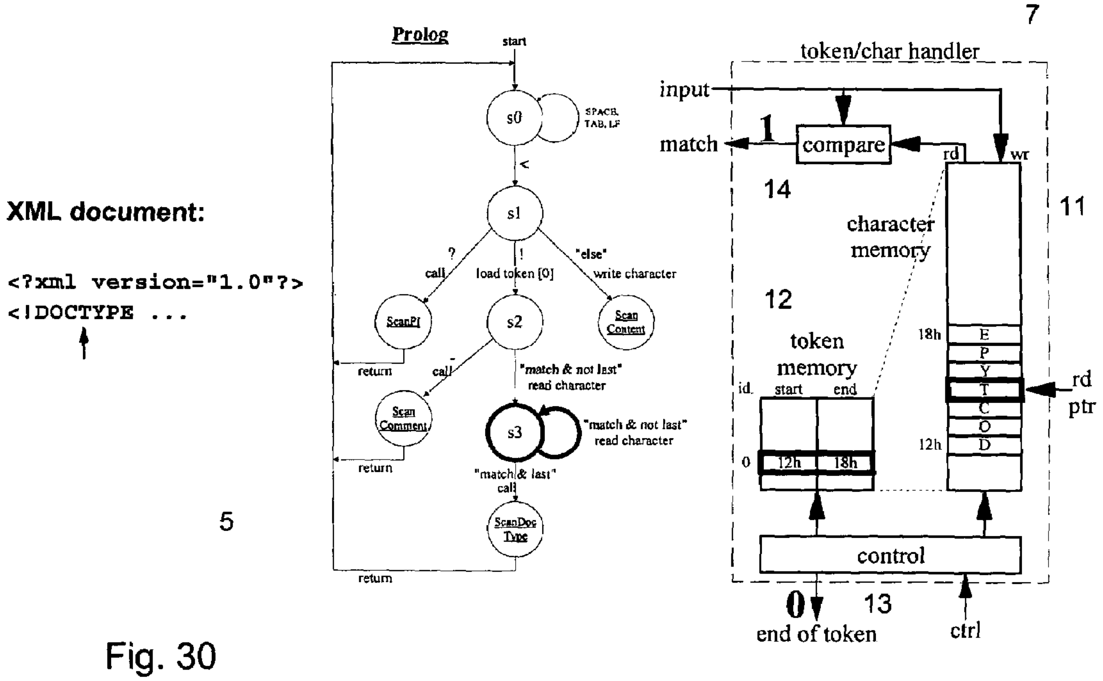
Figure 31:
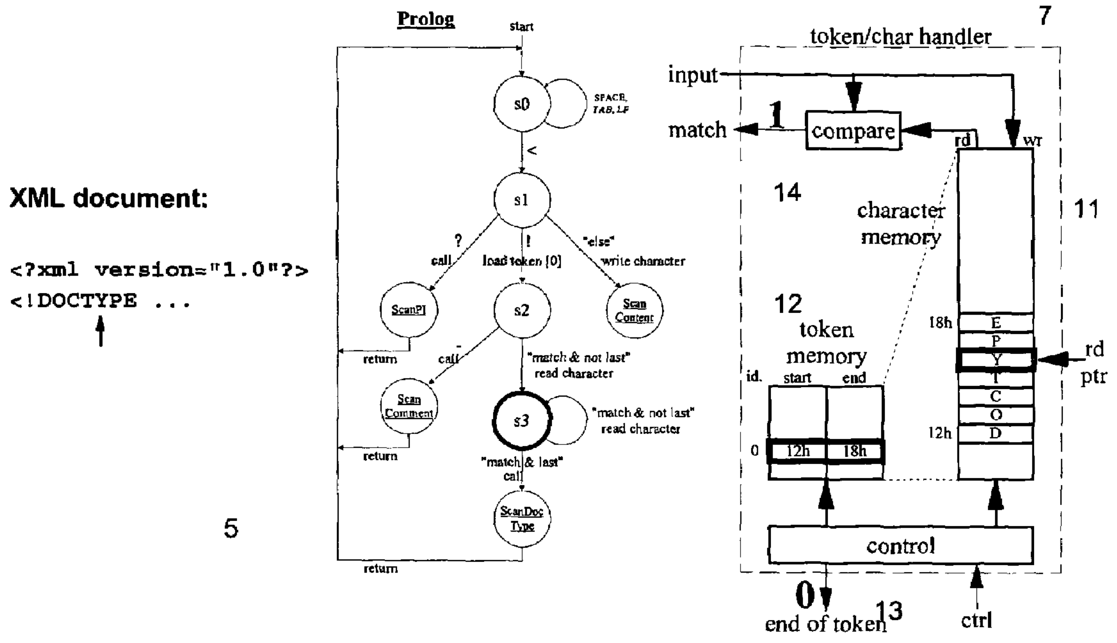
Figure 32:
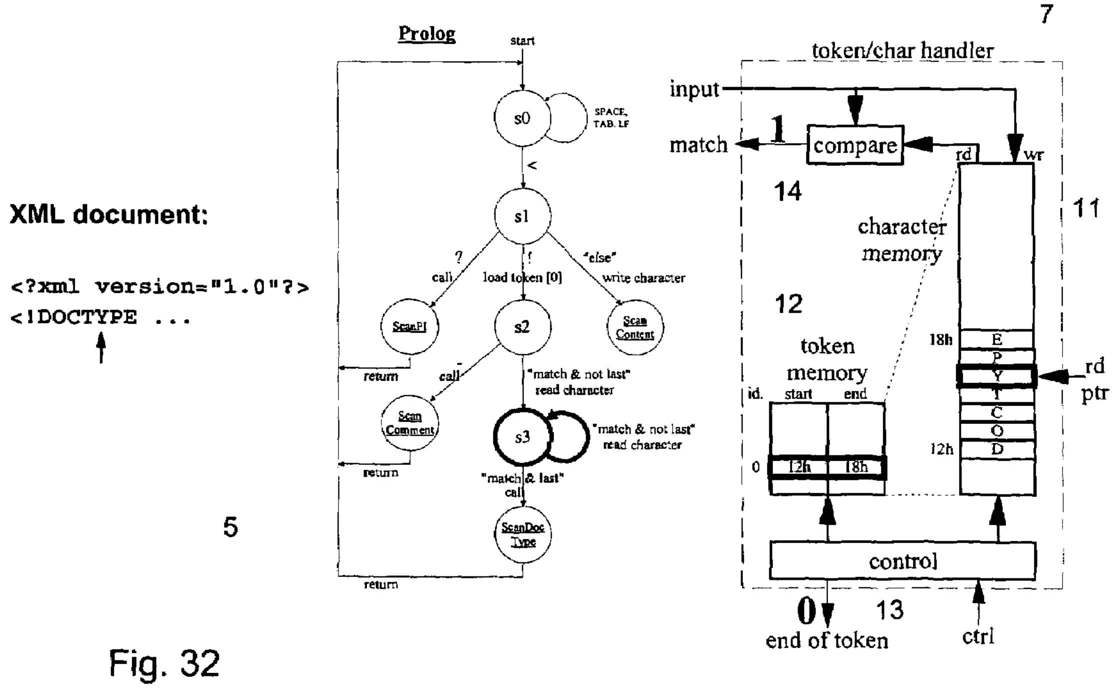
Figure 33:
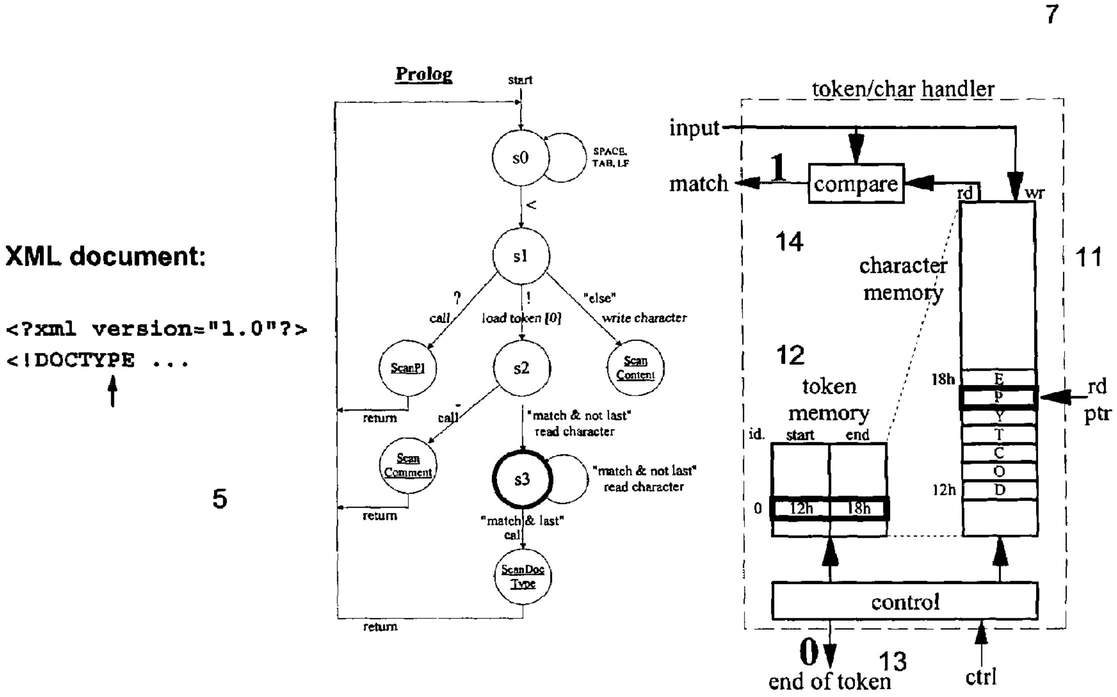
Figure 34:
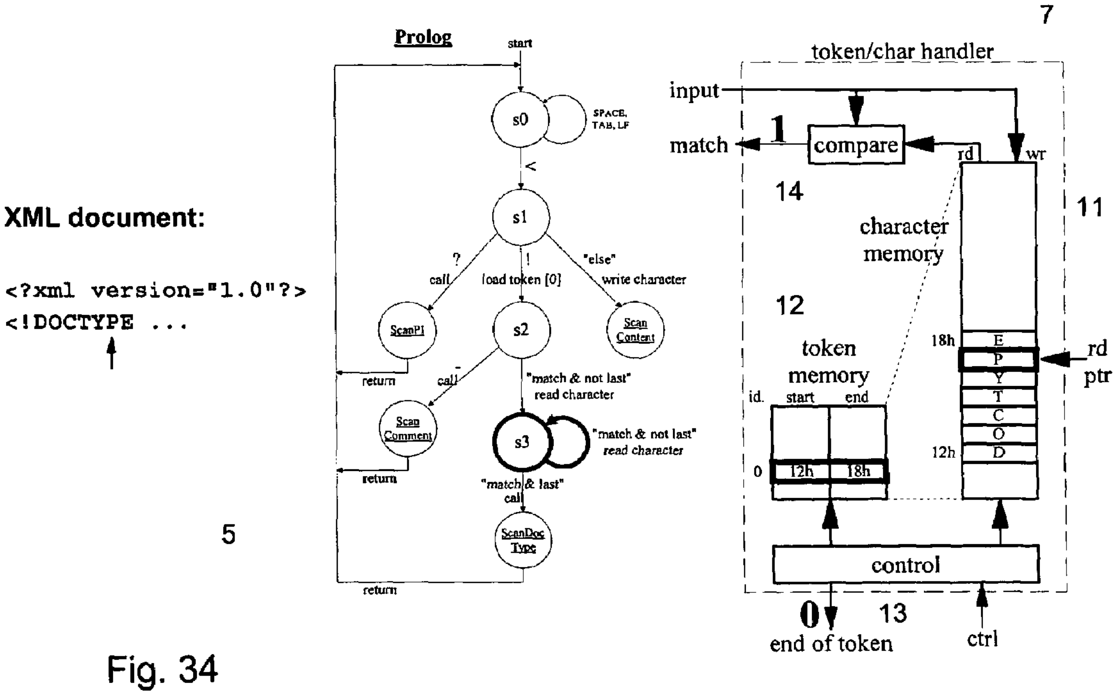
Figure 35:
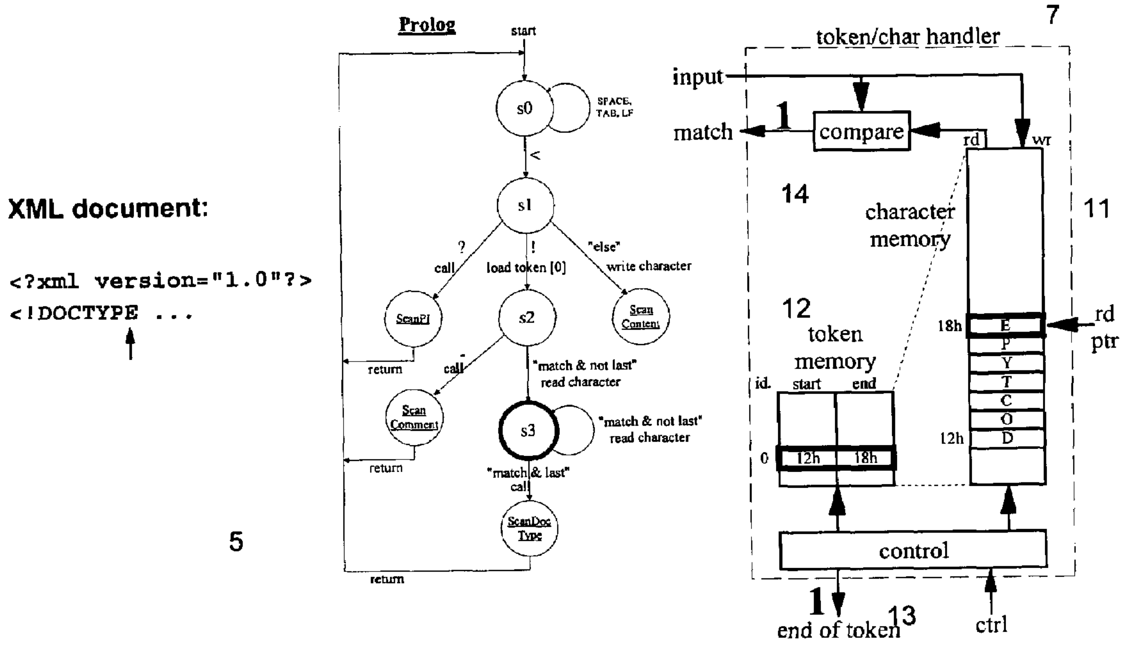

Accordingly, as shown in FIGS. 23 and 24, the system moves to the state S3. While executing ("taking") the transition to state S3, a "read character" command is encountered, which increments the read pointer by one. In state S3, characters are compared as discussed above in relation to state S2, until the last character in the token has been reached. Thus, as shown in FIGS. 25 to 35, the system proceeds to compare the stored character string "DOCTYPE" with the input character string "DOCTYPE" confirming that a match is made at each character, in the present example, until the final character "E" is reached (FIG. 35), at which point as well as indicating that there is a match with the last character in the character string, the character processing unit 7 also provides an output indicating that the end of the character string (token) has been reached.

Figure 36:
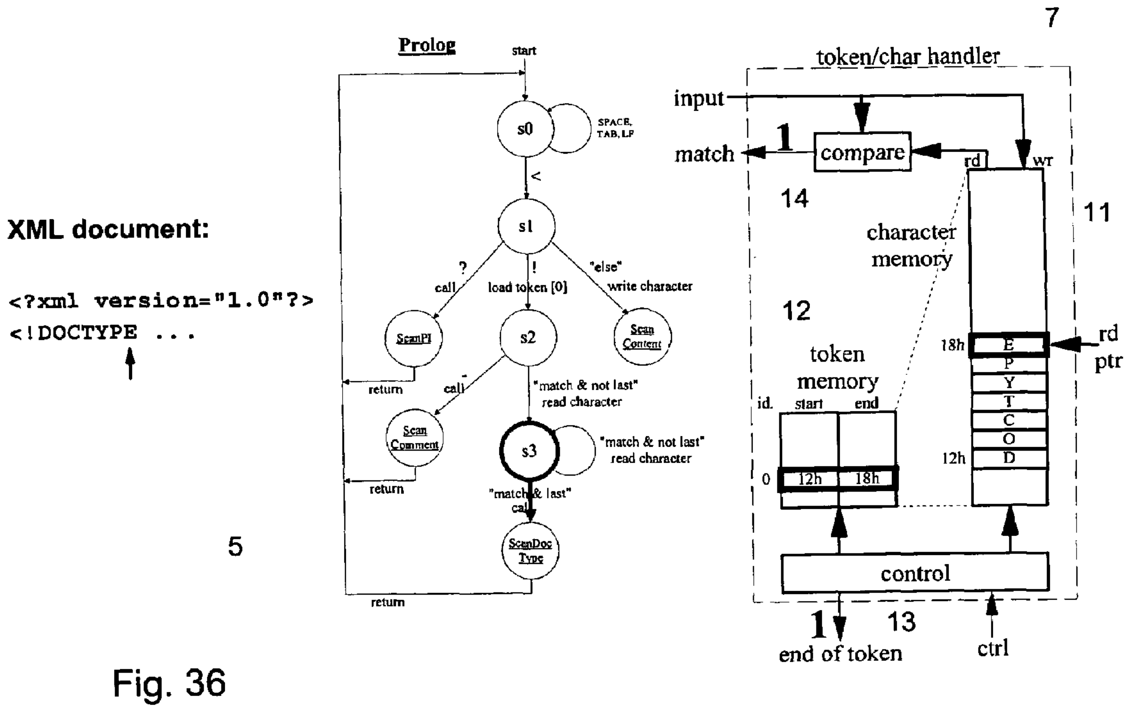
Figure 37:
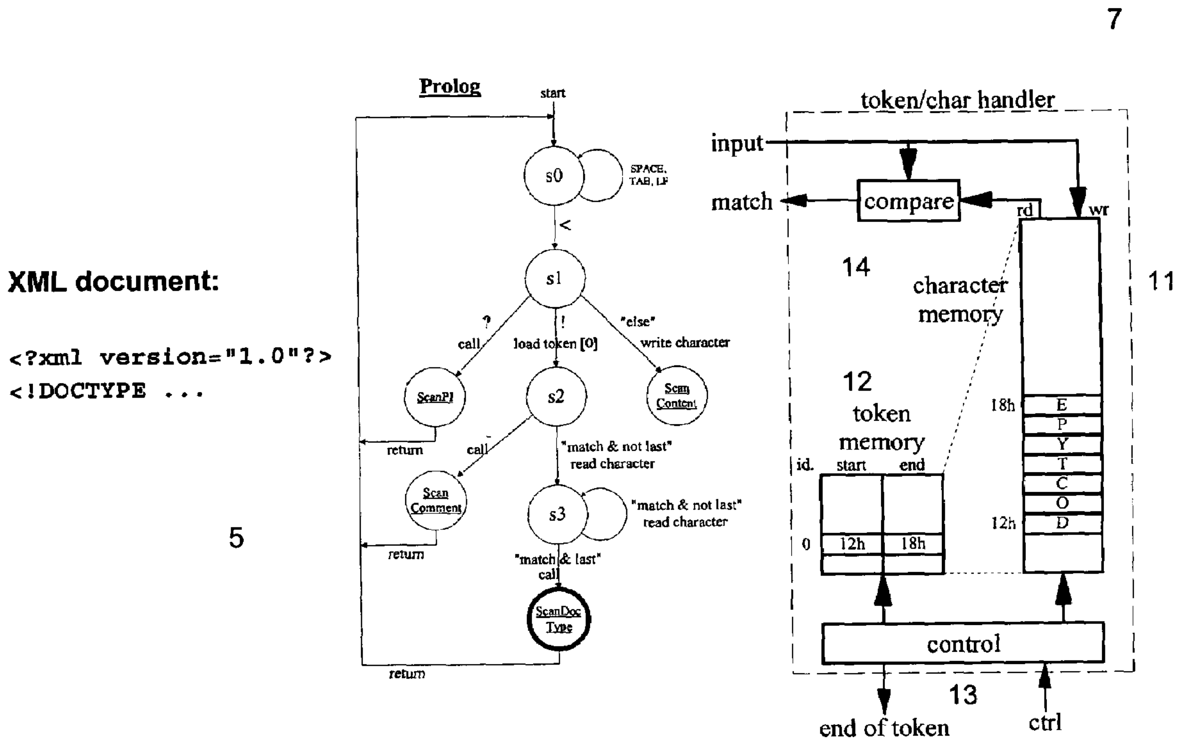

In response to the end of token (character string) output, the programmable state machine has its condition "match and last" in state S3 met, and so proceeds to the next state which is to call the "ScanDocType" procedure (not shown) as shown in FIGS. 36 and 37. The "ScanDocType" procedure is another segment of (state space within) the state diagram, and, in the present embodiment, operates to parse the DTD (Document Type Definition) from the input XML document.

The above description illustrates how a sequence of input characters can be tested against a character string that is stored in the character memory.

In a similar way, a sequence of input characters can be written into the character memory. This operation will now be described with reference to FIG. 38, in which a first part of the "ScanContent" routine (as discussed above) is illustrated.

Figure 38:
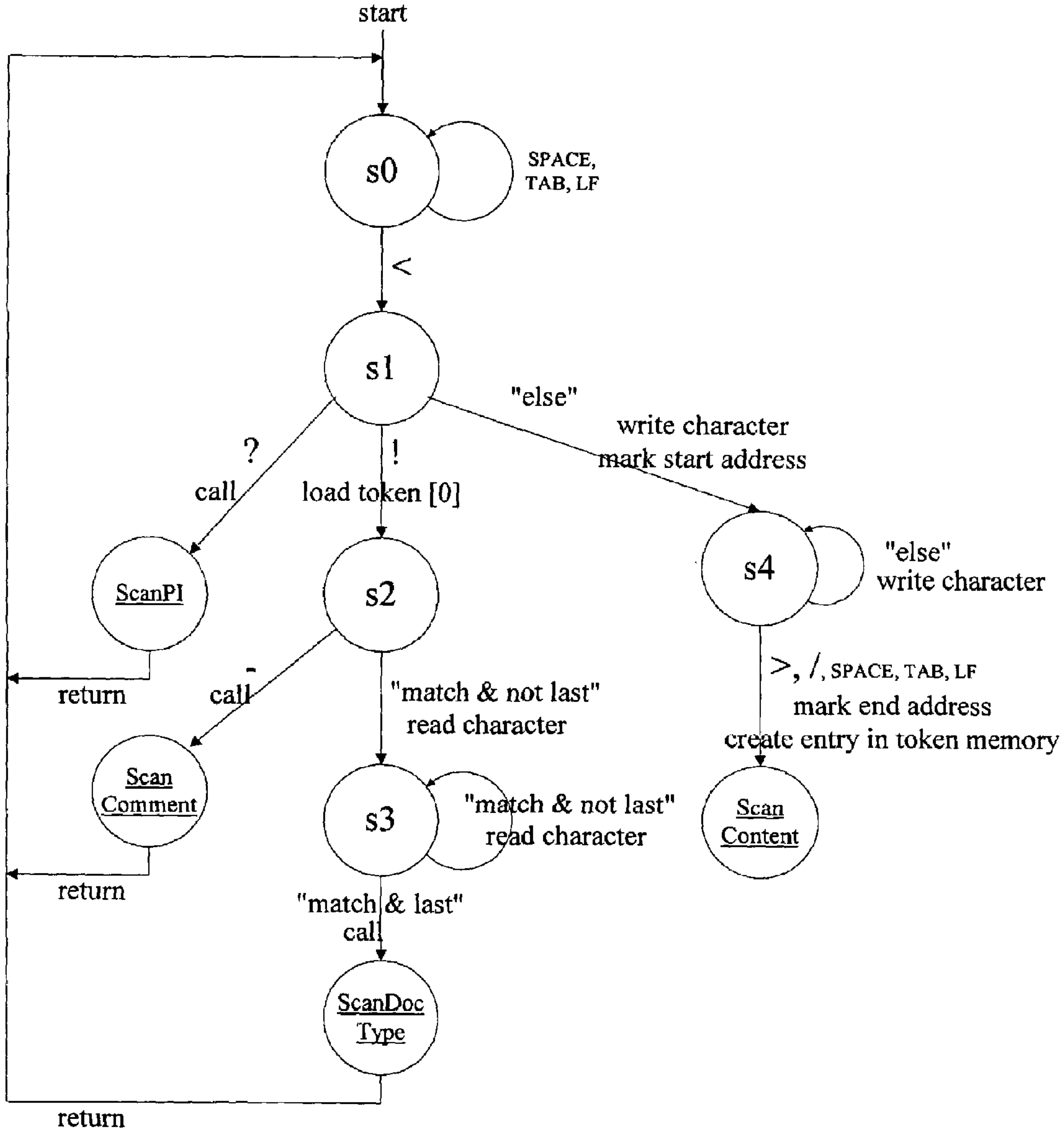

As shown in FIG. 38, if a transition is made from state S1 to state S4, the first character of the element name is written into the character memory at the current write pointer. The address of this first character, i.e., the value of the write pointer, is also marked as the start address of the character string. Next the write pointer is incremented. The "write character" instruction is similar to the "read character" instruction in the above-described operation, in that it will increment a pointer into the character memory, only in this case a character will be written to instead of read from the memory.

As shown in FIG. 38, if the next input character is part of the element name, i.e., it is not white space or a '/' or '>' symbol, then a transition will be made to the same state S4, which will write the input character into the character memory and increment the write pointer.

This procedure is iterated until a white space or a '/' or '>' symbol is detected, which then initiates a transition to the "remainder" of the "ScanContent" routine. This transition also marks the last address of the character string that has just been written into the character memory, and creates an entry in the token (character string) memory containing the start and end addresses of the written character string.

As discussed above in relation to the "DOCTYPE" string, this new stored character string can used at a later point in time, for example, to compare it with the element name occurring in an end tag, e.g., in order to validate the XML well-formedness rule specifying that corresponding start and end tags should have matching element names.

It can be seen from the above that a preferred embodiment of the present invention is a pattern-matching system composed of a programmable state machine and a character processing unit. The programmable state machine controls the character processing unit by providing instructions. The character processing unit provides the results of the processing back to the programmable state machine, which it then uses to select the next instructions.

The programmable state machine implements a state transition diagram containing multiple states and state transitions. To each state transition a set of multiple conditions that can relate to the value of the current input character and to the results provided back by the character processing unit are attached. In addition, to each state transition there is also attached an instruction or a set of instructions, that are sent to the character processing unit if that state transition is "taken". Both the conditions and the instructions are programmable.

By specifying the appropriate conditions for each state transition, it is possible to program exactly how the state diagram will be "walked" through, and consequently, what instructions will be sent to the character processing unit in response to any stream of input characters and any results provided by the character processing unit. Consequently, the programmable state machine provides a very tight control over the character processing unit, which allows it to react very quickly by sending instructions in response to the results provided back by the character processing unit.

It can be seen from the above that the present invention, in its preferred embodiments at least, provides an efficient and effective pattern-matching system that can be used, e.g., for XML parsing. This is achieved by means of a novel "coprocessor" arrangement comprising a programmable controller, preferably in the form of a programmable state machine, and a character processing unit.

The character processing unit implements several character and string processing functions, including storage, retrieval and output of characters or character strings and functions for testing and comparing characters and character strings.

The programmable controller controls the character string processing unit, and is in its preferred embodiments at least able to evaluate multiple conditions in parallel and select a corresponding action.

An output comprising, e.g., the input character stream and/or predefined, stored character strings can also be provided.

The system can be used, for example, to carry out a lexical analysis of an input character stream and convert it into separate character strings (tokens), to check an e.g., XML, document for well-formedness and to, e.g., offload computationally intensive XML processing functions from a more general CPU (central processing unit) of a system, and to carry them out in hardware rather than software.

Furthermore, processing can be carried out in real-time and on-the-fly, thereby avoiding the need to store the, e.g., XML, document being analyzed locally, with relatively high processing rates, e.g., of the order of one character per clock cycle, thereby providing a very fine-grain control of the "instruction execution flow" as is desirable for parsing and pattern-matching operations. It also provides an efficient mechanism for both predefined character string matching and for on-the-fly string matching, such as for start and end tags in XML.

Thus, in the context of XML parsing, for example, the present invention provides in its preferred embodiments at least an improved XML parsing system that can, e.g., be used to more efficiently test for matching start and end tags, and whether those tags are correctly non-overlapping or nested, to test for the presence of pre-defined character strings, character values, such as white space, specific character sets and character encodings, to test whether start and end tags are well-balanced, and to test whether the XML document is not abruptly ended, etc.

The invention claimed is:

1. An apparatus for pattern-matching characters in a stream of received characters, the apparatus comprising:

a character processing unit comprising means for storing characters, and means for comparing a received input character with at least one stored character; and a controller for controlling the character processing unit, the controller including means for receiving an input stream of characters to be pattern-matched and means for controlling the character processing unit to compare characters from the input stream with characters stored by the character processing unit, wherein the character processing unit stores at least one predetermined character or character string, wherein the character processing unit comprises means for combining characters into identifiable character strings, wherein the character processing unit comprises means for providing an output that can then be used by the controller to further control the received character stream processing operation, wherein the character processing unit comprises means for outputting strings of at least one character, wherein the controller comprises means for assessing characters in the received character stream and then selectively controlling and using the character processing unit on the basis of that assessment, wherein the controller comprises means for controlling the output of the apparatus, wherein the controller comprises means for pausing the processing and input of the received character stream, wherein the controller comprises a programmable state machine for receiving the input character stream and for controlling the character processing unit to compare characters in the input character stream with characters stored by the character processing unit, wherein the programmable state machine uses state transition rules, and the state transition rules include a command field that can be used to indicate a required operation of the character processing unit, wherein there is a common set of state transitions that can be invoked from different locations within a state diagram of the programmable state machine, wherein the programmable state machine uses state transition rules to represent state transitions, and the state transition rules are of a plurality of different types, with different types of rules involving different test conditions, and wherein the programmable state machine comprises at least one state transition that causes the programmable state machine to send a command or instruction to a processing unit under the control of the programmable state machine.

* * * * *